(12) United States Patent  
Sugiura

(10) Patent No.: US 7,645,078 B2
(45) Date of Patent: Jan. 12, 2010

(54) PHOTOGRAPHIC LENS DRIVE CONTROL APPARATUS, DRIVE CONTROL METHOD FOR SAME, AND IMAGING APPARATUS INCLUDING SAME

(75) Inventor: Koichi Sugiura, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 178 days.

(21) Appl. No.: 11/971,105

(22) Filed: Jan. 8, 2008

(65) Prior Publication Data

US 2008/0187306 A1    Aug. 7, 2008

(30) Foreign Application Priority Data

Feb. 7, 2007    (JP) .............................. 2007-027714
Apr. 10, 2007    (JP) .............................. 2007-102611

(51) Int. Cl.
  *G03B 5/02*    (2006.01)
  *G03B 17/00*    (2006.01)
(52) U.S. Cl. ...................................... 396/349; 396/448
(58) Field of Classification Search ................. 396/348, 396/349, 448; 359/511
  See application file for complete search history.

(56) References Cited

U.S. PATENT DOCUMENTS

| 6,334,718 | B1* | 1/2002 | Akiba et al. ................. 396/448 |
| 7,180,543 | B2 | 2/2007 | Ojima et al. |
| 2004/0263633 | A1 | 12/2004 | Shinohara et al. |
| 2005/0185946 | A1 | 8/2005 | Sugiura et al. |
| 2006/0017836 | A1 | 1/2006 | Nuno et al. |
| 2006/0188242 | A1 | 8/2006 | Sugiura |
| 2007/0030369 | A1 | 2/2007 | Ojima et al. |
| 2008/0117527 | A1 | 5/2008 | Nuno et al. |

FOREIGN PATENT DOCUMENTS

| JP | 60-98973 | 7/1985 |
| JP | 11-231374 | 8/1999 |
| JP | 2003-195393 | 7/2003 |
| JP | 4001322 | 8/2007 |

* cited by examiner

*Primary Examiner*—W. B. Perkey
*Assistant Examiner*—Minh Q Phan
(74) *Attorney, Agent, or Firm*—Dickstein Shapiro LLP

(57) ABSTRACT

A photographic lens drive control apparatus according to the present invention includes a cap detection section which determines that a lens cap is attached to a lens barrel when a lens barrel movement detection section does not detect movement amount of the lens barrel while a lens barrel drive section allows the lens barrel to move from a contained position to a standby position; and a cap detection control section which performs a series of control over the lens barrel drive section to move the lens barrel from the contained position to the standby position and to stop the lens barrel from moving when the cap detection section determines that the lens cap is attached to the lens barrel, in which a cap detection area where the lens barrel moves from the contained position within a predetermined amount is set in a movement area of the lens barrel.

19 Claims, 20 Drawing Sheets

FIG. 1

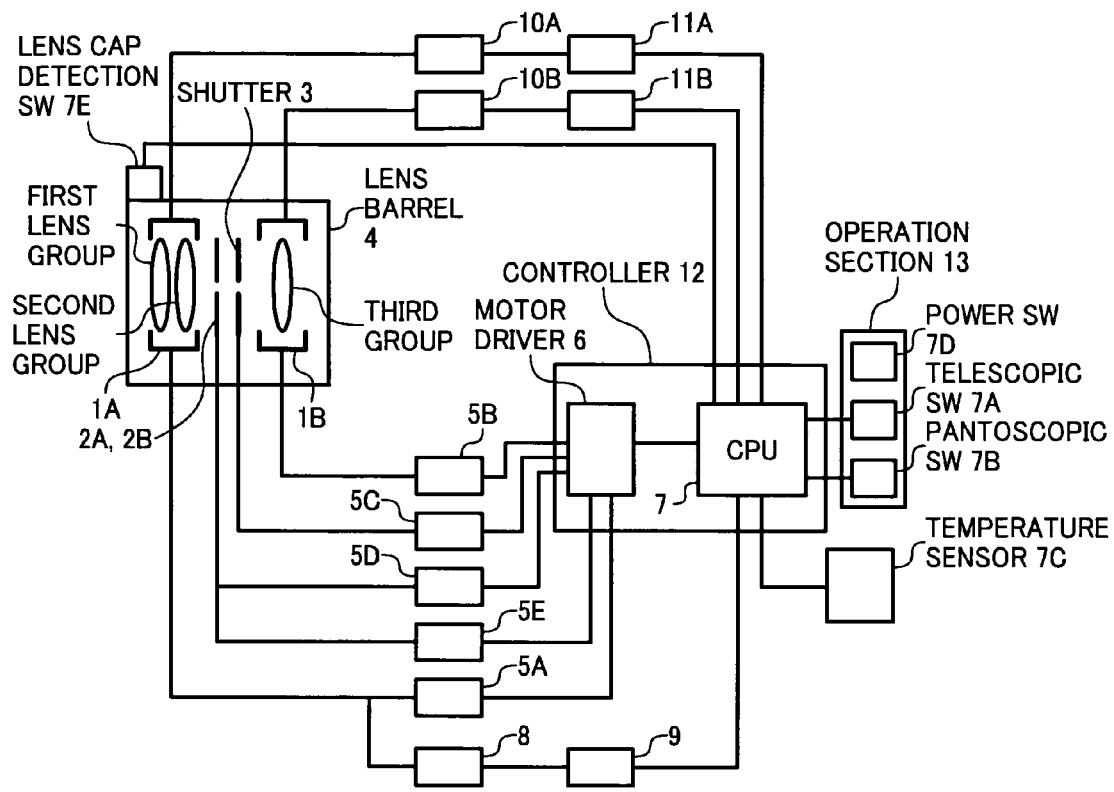

1A: FIRST/SECOND GROUP
1B: THIRD GROUP
2A: FIRST APERTURE DIAPHRAGM
2B: SECOND APERTURE DIAPHRAGM
5A: FIRST/SECOND GROUP MOTOR
5B: THIRD GROUP MOTOR
5C: SHUTTER MOTOR
5D: FIRST APERTURE DIAPHRAGM MOTOR
5E: SECOND APERTURE DIAPHRAGM MOTOR
  8: FIRST/SECOND GROUP MOVEMENT DETECTOR
  9: FIRST/SECOND GROUP MOVEMENT DETECTOR DRIVER CIRCUIT
10A: FIRST/SECOND GROUP REFERENCE POSITION DETECTOR
10B: THIRD GROUP REFERENCE POSITION DETECTOR
11A: FIRST/SECOND GROUP REFERENCE POSITION DETECTOR DRIVER CIRCUIT
11B: THIRD GROUP REFERENCE POSITION DETECTOR DRIVER CIRCUIT

FIG. 2

| | CAP POSITION | REFERENCE POSITION | PANTOSCOPIC | | | | | | PHOTOGRAPHIC AREA | | | | | | | | | | TELESCOPIC |
|---|---|---|---|---|---|---|---|---|---|---|---|---|---|---|---|---|---|---|---|
| CONTAINED POSITION | | | Zp1 | Zp2 | Zp3 | Zp4 | Zp5 | Zp6 | Zp7 | Zp8 | Zp9 | Zp10 | Zp11 | Zp12 | Zp13 | Zp14 | Zp15 | Zp16 | Zp17 |
| | | 0 | 200 | 300 | 400 | 500 | 600 | 700 | 800 | 900 | 1000 | 1100 | 1200 | 1300 | 1400 | 1500 | 1600 | 1700 | 1800 |
| −600 | −500 | | | | | | | | | | | | | | | | | | |
| FIRST/SECOND GROUP | | | | | | | | | | | | | | | | | | | |

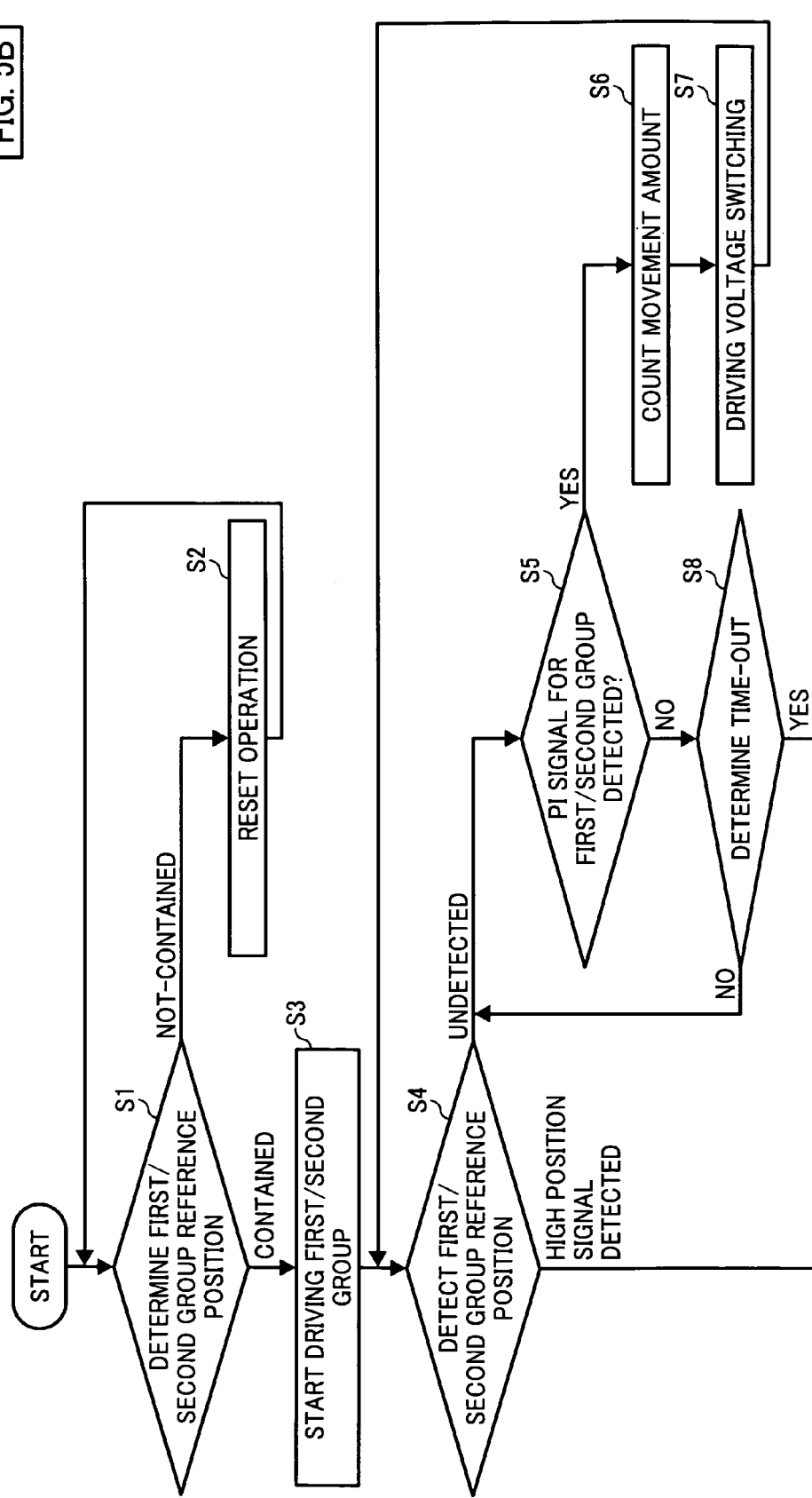

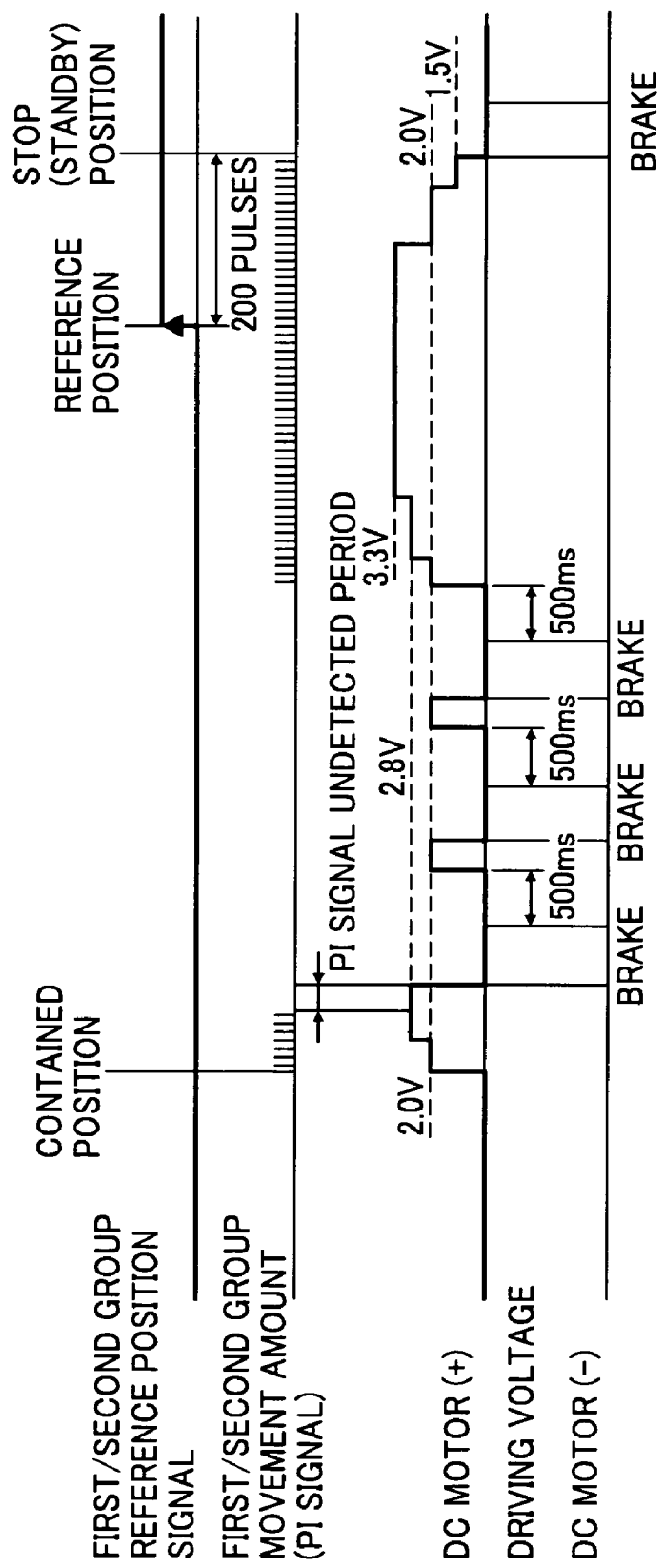

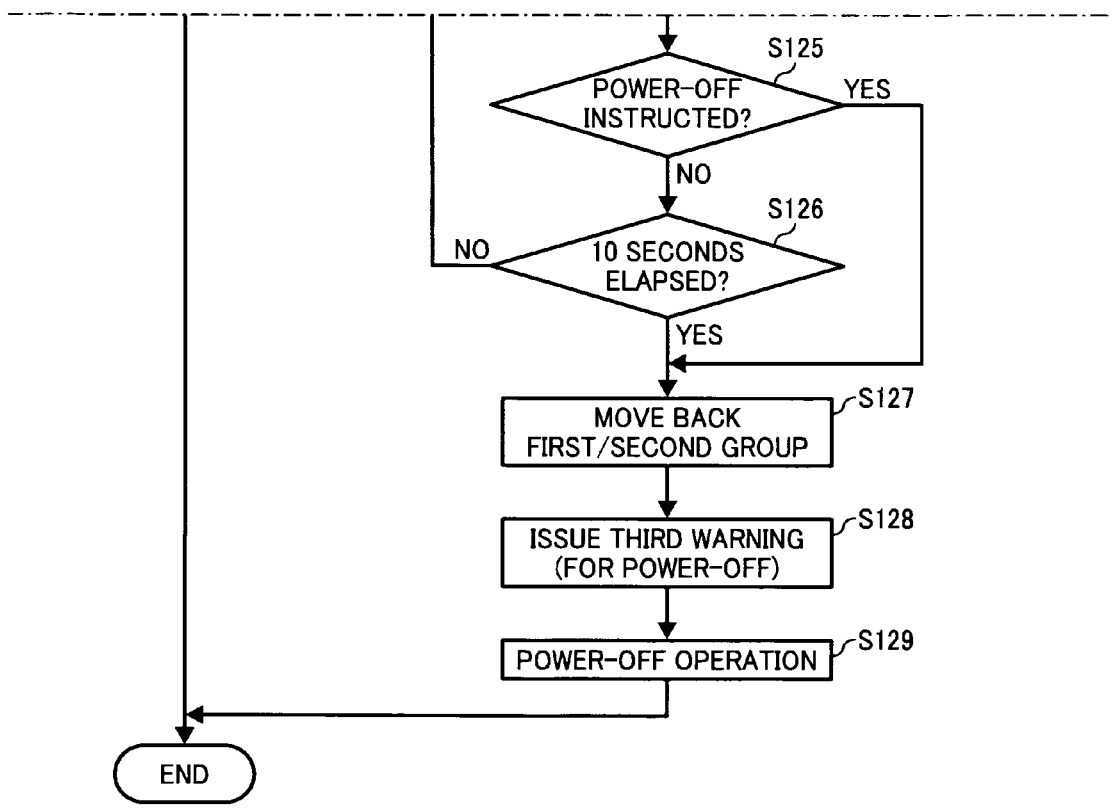

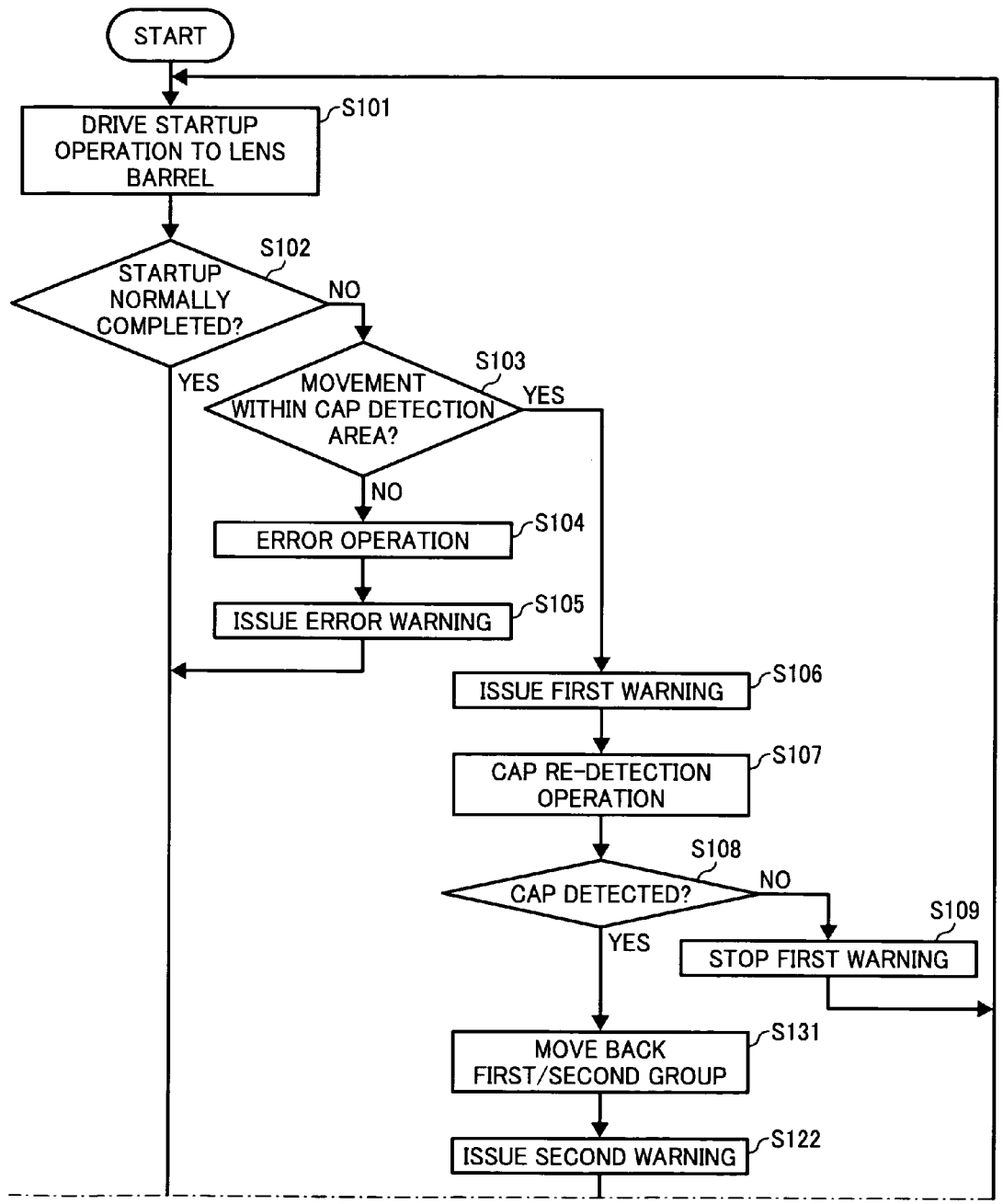

PHOTOGRAPHIC LENS DRIVE CONTROL APPARATUS, DRIVE CONTROL METHOD FOR SAME, AND IMAGING APPARATUS INCLUDING SAME

CROSS REFERENCE TO RELATED APPLICATIONS

The present application is based on and claims priority from Japanese Patent Application No. 2007-27714, filed on Feb. 7, 2007 and No. 2007-102611, filed on Apr. 10, 2007, the disclosure of which is hereby incorporated by reference herein in its entirety.

BACKGROUND OF THE INVENTION

1. Field of the Invention

The present invention relates to a drive control apparatus for a photographic lens with a detachable lens cap to cover the front thereof, a drive control method therefor, and an imaging apparatus including the photographic lens drive control apparatus.

2. Description of the Related Art

A conventional imaging apparatus (hereinafter to be referred to as camera) is provided with a lens cap to cover the front of a photographic lens during non-use of the camera for the purpose of protection or fouling prevention of the lens. Further, along with development of thin-model, small-sized cameras, the lens barrel thereof generally incorporates the lens, and a mainstream lens barrel is of a collapsible type which moves from a non-photographable collapsed position to a photographable standby position.

There is a problem in the collapsible type lens barrel that when moved from the collapsed position to the standby position with the lens cap attached, the lens barrel front interferes with the attached lens cap to prevent the lens barrel to move, affecting the operation of photographing.

In order to prevent this problem from occurring, it is needed to detect attachment or detachment of the lens cap. For example, Japanese Laid-Open Utility Model Patent Application Publication No. Sho 60-98973 has disclosed a technique to detect the attachment or detachment of the lens cap with a switch. However, this technique has a problem that the lens cap need be of a specific shape so that the switch can be switched over according to attachment or detachment of the lens cap without fail. Another problem is that it is necessary to secure a space to dispose the switch.

Moreover, Japanese Laid-Open Patent Application Publication No. Hei 11-231374 has disclosed a technique to detect the lens cap by detecting brightness with a photometric sensor. However, this technique has a problem that in dark environment such as in night time, it is not possible to distinguish darkness due to the covering lens cap from darkness due to outside light, which may cause erroneous operation in the camera. Also, it is needed to secure a space to dispose the photometric sensor.

For another example, Japanese Laid-Open Patent Application Publication No. 2003-195393 has disclosed a lens barrel which has a built-in lens cap (optical barrier wings) configured to open responding to a manipulation to a power-on switch or the like. However, it is not always possible for the lens barrel to incorporate the lens cap depending on the structure of the photographic lens or the like.

There is still another technique to detect attachment or detachment of the lens cap by pressing the lens barrel body onto the lens cap. The problem of this technique is that when the camera is powered off with the edge of the lens barrel pressed onto the lens cap, and the lens cap is removed, the lens barrel is to be in a slightly projected state, which damages the appearance of the camera. Also, it may not be able to re-attach the lens cap on the lens barrel in the projected state.

SUMMARY OF THE INVENTION

In view of solving the above problems, an object of the present invention is to provide a photographic lens drive control apparatus which has a function to accurately detect detachment or attachment of the lens cap irreverent of the shape of the lens cap and is able to notify a user of a result of the detection, as well as a drive control method therefor and an imaging apparatus including the photographic lens drive control apparatus.

According to one aspect of the present invention, a photographic lens drive control apparatus comprising a collapsible lens barrel incorporating a photographic lens and moving from a non-photographable contained position to a photographable standby position, a lens barrel drive section driving the lens barrel, and a lens barrel movement detection section detecting an amount of movement of the lens barrel, the apparatus comprising: a cap detection section which determines that a lens cap is attached to the lens barrel when the lens barrel movement detection section does not detect the movement amount while the lens barrel drive section allows the lens barrel to move from the contained position to the standby position; and a cap detection control section which performs a series of control over the lens barrel drive section to move the lens barrel from the contained position to the standby position and to stop the lens barrel from moving when the cap detection section determines that the lens cap is attached to the lens barrel, in which in a movement area of the lens barrel from the contained position to the standby position, an area where the lens barrel moves from the contained position within a predetermined movement amount is set to be a cap detection area. With such a configuration, moving the lens barrel for the lens cap detection makes it possible to detect the attachment of the lens cap irrespective of the shape thereof.

According to another aspect of the present invention, in the photographic lens drive control apparatus, a driving voltage at which the lens barrel drive section moves the lens barrel from the contained position to the standby position is set to be lower in the cap detection area than in the movement area other than the cap detection area. Moreover, when the lens barrel movement detection section does not detect the movement amount of the lens barrel in the cap detection area within a predetermined length of time, the cap detection section determines that the lens cap is attached to the lens barrel. With such a configuration, it is possible to alleviate the interference between the lens cap and the lens barrel by reducing the detection time and the driving voltage of the lens barrel at the lens cap detection.

According to still another aspect of the present invention, in the photographic lens drive control apparatus a first warning is issued to a user via a notifying section while the cap detection section determines that the lens cap is attached to the lens barrel. Therefore, it is possible to issue a warning for the attachment of the lens cap to the user.

According to still another aspect of the present invention, in the photographic lens drive control apparatus, while the cap detection section determines that the lens cap is attached to the lens barrel, the cap detection control section repetitively performs the series of control over the lens barrel drive section a predetermined number of times.

According to still another aspect of the present invention, in the photographic lens drive control apparatus, when the cap detection section determines that the lens cap is attached to the lens barrel after the cap detection control section repetitively performs the series of control over the lens barrel drive section the predetermined number of times, to move the lens barrel by a predetermined amount in a direction of the contained position, or to move the lens barrel by a predetermined amount in a direction of the contained position after elapse of a predetermined length of time.

With the above configurations, it is possible to reduce the load on the lens barrel and influence on current consumption. Also, the lens barrel is moved back to the direction of the contained position after the series of control over the lens barrel drive section is repetitively made the predetermined times or after the elapse of the predetermined length of time. This can facilitate the re-attachment of the lens cap and reduce the impact of the interference between the lens barrel and the lens cap by repeating the detection control from the stop position of the lens barrel.

According to still another aspect of the present invention, in the photographic lens drive control apparatus, the cap detection control section is inhibited from performing the series of control over the lens barrel drive section after repetitively performing them, and then a second warning is issued to a user via the notifying section. Further, a third warning is issued to a user via the notifying section when a predetermined length of time for issuing the second warning has elapsed. This makes it possible to notify the user of the attachment of the lens cap to the lens barrel for sure.

According to still another aspect of the present invention, provided is a drive control method for a photographic lens drive control apparatus comprising a collapsible lens barrel incorporating a photographic lens and moving from a non-photographable contained position to a photographable standby position, a lens barrel drive section driving the lens barrel, and a lens barrel movement detection section detecting an amount of movement of the lens barrel. The drive control method comprises a cap detection step of determining that a lens cap is attached to the lens barrel when the lens barrel movement detection section does not detect the movement amount while the lens barrel drive section allows the lens barrel to move from the contained position to the standby position; and a cap detection control step of performing a series of control over the lens barrel drive section to move the lens barrel from the contained position to the standby position and to stop the lens barrel from moving when the cap detection section determines that the lens cap is attached to the lens barrel, in which in a movement area of the lens barrel from the contained position to the standby position, an area where the lens barrel moves from the contained position within a predetermined movement amount is set to be a cap detection area.

According to still another object of the present invention, provided is an imaging apparatus comprising a case having a detachable lens cap mounted to cover a front of a photographic lens, and including an image capturing section and a photographic lens drive control apparatus comprising a collapsible lens barrel incorporating a photographic lens and moving from a non-photographable contained position to a photographable standby position; a lens barrel drive section driving the lens barrel, and a lens barrel movement detection section detecting an amount of movement of the lens barrel; a cap detection section which determines that a lens cap is attached to the lens barrel when the lens barrel movement detection section does not detect the movement amount while the lens barrel drive section allows the lens barrel to move from the contained position to the standby position; and a cap detection control section which performs a series of control over the lens barrel drive section to move the lens barrel from the contained position to the standby position and to stop the lens barrel from moving when the cap detection section determines that the lens cap is attached to the lens barrel, in which in a movement area of the lens barrel from the contained position to the standby position, an area where the lens barrel moves from the contained position within a predetermined movement amount is set to be a cap detection area. With such a configuration, it is possible to provide an imaging apparatus which is detectable of the attachment or detachment of the lens cap irrespective of the shape thereof without an additional external mechanism or the like As described above, according to the present invention, the attachment or detachment of the lens cap is detectable irrespective of the shape thereof by moving the lens barrel and pressing it onto the lens cap attached. Further, with the provision of the cap detection area, it is possible to accurately detect the attachment or detachment of the lens cap, reduce the impact due to the interference between the lens cap and the lens barrel by decreasing the driving voltage in the cap detection area, and issue warning for the attachment of the lens cap to the user.

BRIEF DESCRIPTION OF THE DRAWINGS

FIG. 1 is a block diagram showing the structure of a photographic lens drive control apparatus according to a first embodiment of the present invention;

FIG. 2 shows a relation ship between output pulses from a first/second lens group movement detector and a zoom position ZP;

FIGS. 5A-5B are a flowchart for lens barrel drive control according to the first embodiment;

FIG. 8 is a timing chart for cap re-detection operation according to the first embodiment;

FIGS. 14A-14B are a flow chart for operation after cap re-detection according to the fourth embodiment; and FIGS. 15A-15B are a flowchart for another operation after cap re-detection operation according to the fourth embodiment.

DETAILED DESCRIPTION OF THE PREFERRED EMBODIMENT

Figure 3:
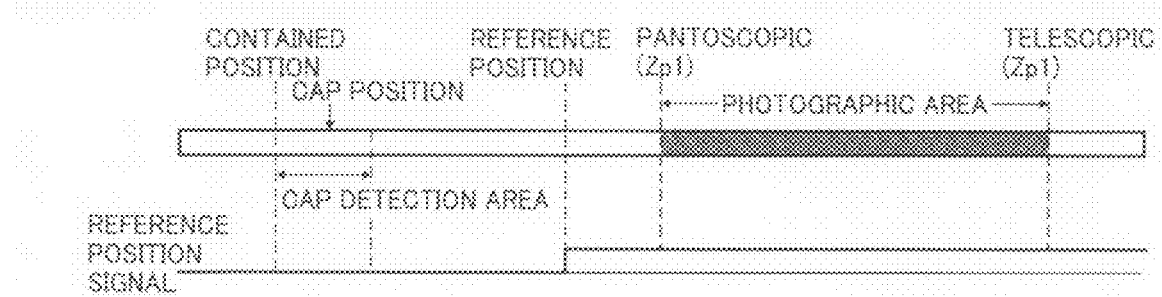
FIG. 3 shows a relationship among a reference position, a zoom position, and a contained position.

Hereinafter, embodiments of the present invention will be described in detail with reference to the accompanying drawings.

First Embodiment

FIG. 1 shows the structure of the photographic lens drive control apparatus according to the first embodiment of the present invention. The photographic lens drive control apparatus includes a photographic lens 1, a shutter 3, a lens barrel 4, motors 5A to 5E, aperture diaphragms 2A, 2B, a first/second group movement detector 8 (lens barrel movement detection section), a first/second group movement detector driver circuit 9 (lens barrel drive section), a first/second group reference position detector 10A (cap detection section), a third group reference position detector 10B, a first/second group reference position detector driver circuit 11A (cap detection control section), a third group reference position detector driver circuit 11B, a controller 12, an operation section 13, and a temperature sensor 7C. As shown in FIG. 1, the photographic lens 1 includes a three lens group, a first lens group, a second lens group, and a third lens group each including a plurality of lenses and arranged in order from an object. The first and second lens groups are integrated into one which is hereinafter to be referred to as first/second group 1A (on object side). The third lens group is to be referred to as third group 1B.

The first/second group 1A and the third group 1B have a common optical axis and are disposed in the lens barrel 4. Behind the first/second group 1A, provided are the first and second aperture diaphragms 2A, 2B for adjusting an amount of light passing through the photographic lens 1 from an object, and a shutter 3 for controlling exposure time at shooting.

The first/second group 1A is a zoom lens group and moves together with a lens barrel 4 to change a magnification, and the third group 1B is a focus lens group for focusing an image of an object on the exposure plane (not shown) positioned behind the third group 1B. The first/second group 1A and the third group 1B are driven by respective motors in the lens barrel 4 to move in parallel with the optical axis and compose an intended optical system.

A first/second group motor 5A driving the first/second group 1A is a direct-current (DC) motor, and the third group motor 5B driving the third group 1B is a pulse motor (drive mechanism not shown). The DC motor is a lens drive device whose drive speed varies in accordance with an applied driving voltage, and is able to adjust the drive speed of the first/second group 1A by a simple operation of changing the applying voltage.

In general, DC motors can be rotated at a higher speed than pulse motors with the same electric power supplied, and driving current thereof changes according to a change of load so that an increase in load causes an increase in the driving current, resulting in increasing driving torque. Therefore, they are unsusceptible to load changes and can smoothly operate. They are suitable for driving tube cams which change in inclination (load torque) in accordance with a zoom position, for example.

The DC motors are also a lens drive device whose drive speed changes according to a duty ratio (where a time for on state accounts for a single period), so that the drive speed for the first/second group 1A can be adjusted by simply changing the ratio of drive energizing time inputted to the lens drive device.

However, for stopping, they overrun due to law of inertia so that it is difficult to stop the DC motors at an intended position. In this respect, the pulse motors can be stopped at an arbitrary target position easily since they are driven by being given pulses, but they are susceptible to torque variation. Accordingly, the pulse motors are suitable for use with a little torque variation.

The first and second aperture diaphragms 2A, 2B, and shutter 3 are provided with a first aperture diaphragm motor 5D, a second aperture diaphragm motor 5E, a shutter motor 5C, and are driven by them, respectively (drive mechanism not shown). These motors 5A to 5E are electrically connected with a motor driver 6 and controlled thereby intensively.

The motor driver 6 is connected with a CPU 7 and obtains therefrom necessary information for control of the driving of the motors 5A to 5E such as driving voltage, drive timing, driving amount, or driving direction, to perform drive control over the motors 5A to 5E based on the information. The first/second group motor 5A is provided with a first/second group movement detector 8 composed of a circular plate having a rotational axis with a large number of slits to generate pulses of a number depending on the number of rotations of the motor, and a photointerrupter detectable of the slits, or the like, for example. The first/second group movement detector 8 is electrically connected with a first/second group movement detector driver circuit 9 and driven thereby. Pulses outputted from the first/second group movement detector 8 are captured by the CPU 7.

The first/second group movement detector 8 is set to output a predetermined number of pulses, 1280 for example, from when the photographic lens 1 is in the most telescopic state to when it is in the most pantoscopic state. And, the entire area from the most telescopic position to the most pantoscopic position is divided into a prescribed number (in 16 equal divisions, 1 division per 80 pulses, for example) of sections. The 16 sections have 17 breakpoints, and position indicators, so-called zoom positions Zp1, Zp2, ... Zp17 are set at the breakpoints.

FIG. 2 shows a relationship between the output pulses from the first/second group movement detector 8 and zoom positions Zp1, Zp2, ... Zp17. FIG. 3 shows a relationship among a reference position, a zoom position, and a contained position. In FIG. 2, the numbers signify the number of pulses counted when it is set to "0" at the reference position. Also, the number of pulses is counted in negative numbers when the lens group moves from the reference position to the contained position.

The third group motor 5B is driven at a drive speed which is in accordance with the number of pulses received from the motor driver 6 according to an instruction from the CPU 7.

Further, the first/second group 1A and the third group 1B are provided with a first/second group reference position detector 10A and a third group reference position detector 10B, respectively, to determine whether or not the lens groups are in the reference position. The detected reference positions are captured by the CPU 7. The first/second group and third group reference position detectors are driven by a first/second group reference position detector driver circuit 11A and a third group reference position detector driver circuit 11B, respectively.

The CPU 7 is connected with a telescopic switch 7A (telescopic SW in FIG. 1) for telescopic shooting to heighten the magnification of the photographic lens 1 and a pantoscopic switch (pantoscopic SW in FIG. 1) for pantoscopic shooting to lower the magnification thereof. The CPU 7 is also connected with a lens cap detection switch 7E for detection of the lens cap. The CPU 7 controls the respective lens group motors 5A, 5B in response to manipulation to the telescopic and pantoscopic switches 7A and 7B which are disposed in an operation section 13. The CPU 7 also functions as a notifying section to issue warning to a user upon the detection of the lens cap from the lens cap detection switch 7E, which will be described later. Other switches (for example, power switch 7D or the like) to instruct other operations from outside are also disposed in the operation section 13. The motor driver 6 and the CPU 7 constitute a controller 12.

The first and second lens groups constituting the first/second group 1A are installed in a tube cam (not shown) in the lens barrel 4. When the first/second group motor 5A drives the first/second group 1A together with the lens barrel 4, the interval of the first and second lens groups is mechanically adjusted to a prescribed interval by a cam mechanism.

The CPU 7 is also connected with a temperature sensor 7C which outputs different voltage values depending on a temperature. The CPU 7 A/D converts the voltage values. This enables an influence from temperature changes to be reduced by correcting a displacement of the lens barrel 4, for example. The temperature sensor 7C according to the first embodiment has a characteristic of varying at 10 mV per 1° C. Therefore, it is possible to know a current temperature by recording a voltage value obtained at an arbitrary temperature.

Figure 5B:
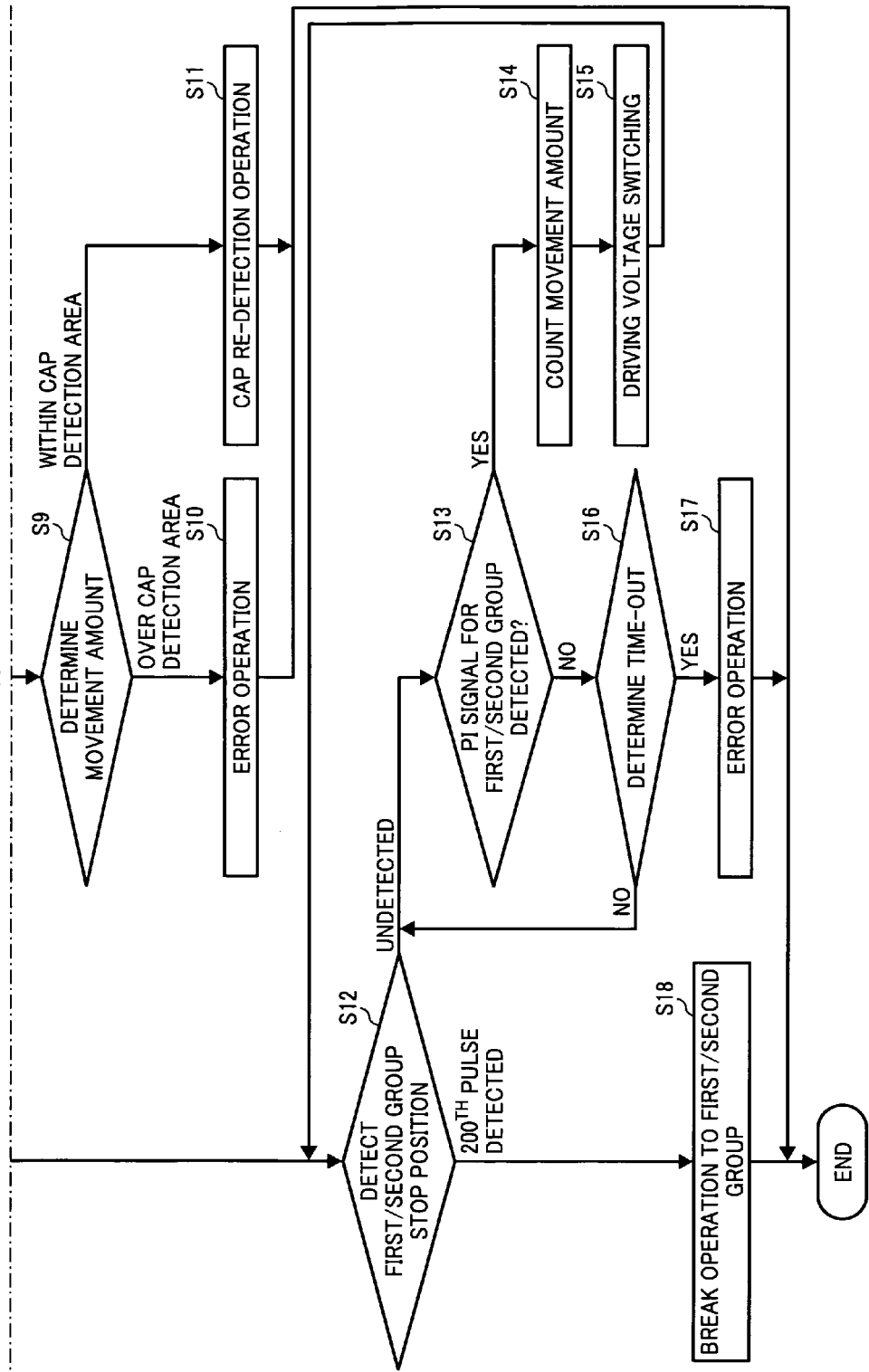
Figure 6:
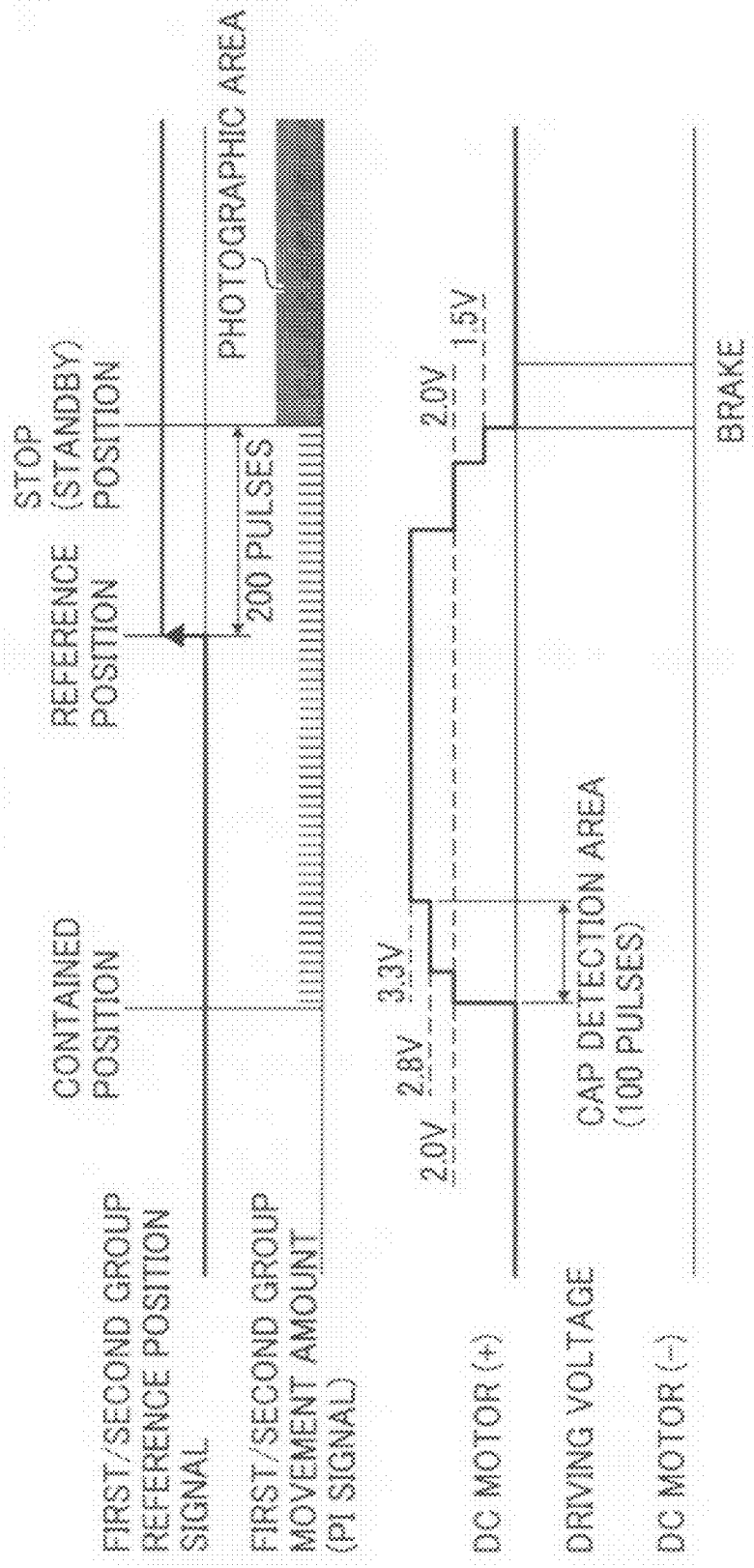
FIG. 6 is a timing chart for lens barrel drive control according to the first embodiment.

Next, with reference to FIG. 1, and following the flowchart in FIG. 5 and the timing chart in FIG. 6, a drive control method for the lens barrel to move from the contained position (collapsed state) in FIG. 4B to a photographable standby position in FIG. 4C will be described.

First, the first/second group reference position detector 10A determines a reference position of the lens barrel (S1). At a first/second group reference position signal of high level (H), it determines that the lens barrel is in a non-contained position, and performs a reset operation (S2). The reset operation is for temporarily retreating the third group 1B and then driving the first/second group motor 5A in such a direction that the first/second group reference position signal turns from high to low, and thereby returning the first/second group 1A to the contained position. Thereafter, it makes the reference position determination in S1 again. A detailed description thereon will be omitted since it is not directly reverent of the features of the first embodiment.

In the operation of S1, with the first/second group reference position signal at low level, the first/second group reference position detector 10A determines that the lens barrel is in the contained position and performs startup operation (S3). That is, it drives the first/second group motor 5A to the standby position in a pantoscopic direction. Then, the operation waits for the first/second group reference position detector 10A to detect the reference position (where the signal switches from low to high) (S4).

During driving of the first/second group motor 5A, the first/second group movement detector 8 detects the movement amount by counting the edges of a pulse signal (PI signal). When the PI signal is detected in the first/second group's movement amount detection (S5), the movement amount is counted (S6).

In driving voltage switching determination (S7), the driving voltage is switched in accordance with the counted movement amount. During the startup period of the first/second group motor 5A immediately after the start-up thereof, the driving voltage is set to be lower than a stationary voltage in order to prevent an inrush current from the DC motor. After the startup period (8 pulses), the driving voltage is raised from 2.0V to 2.8V which is a driving voltage for cap detection area. Then, it is raised to the stationary voltage of 3.3V after completion of cap detection area detection (over 100 pulses). Setting the driving voltage for the cap detection area to be lower than the stationary voltage makes it possible to relieve the impact of the interference between the lens barrel 4 and the lens cap attached thereto (See FIG. 6).

With no PI signal (the first/second group movement amount) detected in the operation of S5, a length of time where no PI signal has been detected is determined (time-out determination) (S8). With no time-out determined (No in S8), the operation returns to the first/second group movement amount (PI signal) detection in S5.

Note that a length of the time-out in the cap detection area is set to be shorter than that in the other areas. This can shorten the energizing time for the first/second group motor 5A in driving lock-up state with the lens cap attached, and reduce the load on the drive gear system.

When the time-out is determined in S8 (Yes in S8), and the movement amount is determined to be over cap detection area (S9), an error operation is performed (S10). In the error operation, the first/second group motor 5A is stopped from driving. In the movement detection in S9, when the movement amount is determined to be within the cap detection area, cap redetection operation is performed (S11), which will be described in later after the first embodiment.

In S4, the first/second group reference position detector 10A has detected the reference position (where the signal switches from low to high), the counted number of PI signals (movement amount) is reset to zero, and the operation waits for the 200$^{th}$ pulse as a pantoscopic stop position to be detected (the first/second group stop position detection in S12).

Without the stop position detected in S12, the first/second group movement amount (presence/absence of PI signals) is detected (S13). When the PI signal has been detected, the movement amount is counted (S14), and the driving voltage is switched according to the counted number of the PI signals in driving voltage switching determination (S15). That is, with a remaining number of pulses being 50 to a target value of the movement amount (PI signal) being 200 pulses, the driving voltage is decreased to 2.0V. With the remaining number being 10 pulses, it is further decreased to 1.5V. This makes it possible to suppress the overrun of the motor at the stop and improve the stop precision thereof (See FIG. 6).

When the PI signal (the first/second group movement amount) has not been detected in S13, a length of time (time-out) where the PI signal has not been detected is determined (S16). With no time-out determined (No in S16), the operation returns to the first/second group movement amount (PI signal) detection in S13. With the time-out determined (Yes in S16), the error operation is performed (S17), in which the first/second group motor 5A is stopped from driving.

Also, when the first/second group reaches the stop position in S12, a brake is applied to the first/second group motor 5A (S18). During the brake operation, the amount of the overrun is measured, thereby deciding a final first/second group position. This completes the startup operation of the first/second group (lens barrel). A description on that of the third group will be omitted.

Next, with reference to the flowchart in FIG. 7 and the timing chart in FIG. 8, the cap re-detection operation according to the first embodiment will be described.

Figure 4A:
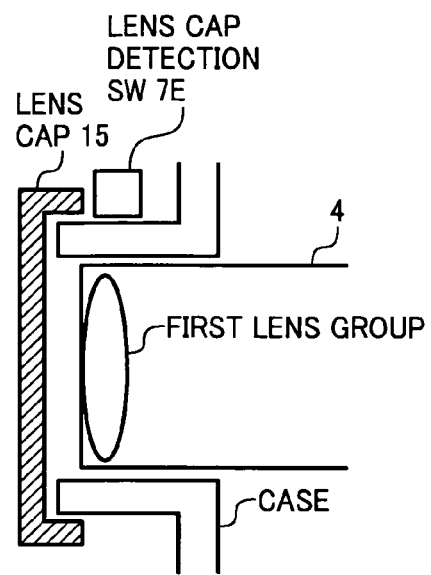
FIG. 4A shows the contained position of the lens barrel and the lens cap.
Figure 4B:
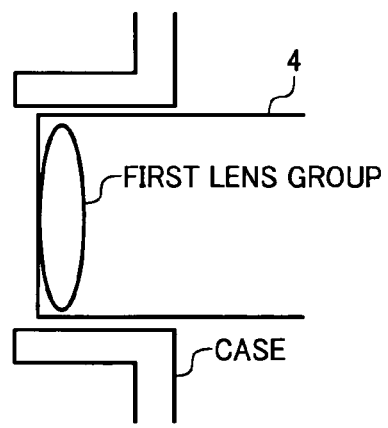
FIG. 4B shows the contained position of the lens barrel.
Figure 4C:
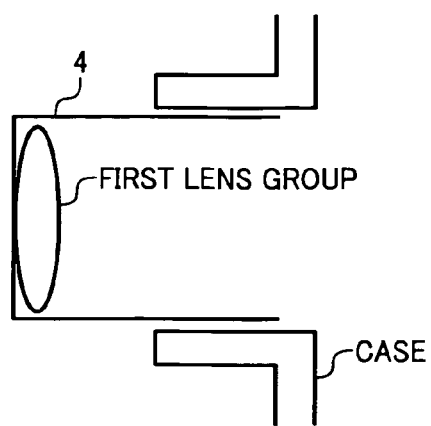
FIG. 4C shows the standby position of the lens barrel.

In the drive start-up operation with the lens barrel 4 in the state of FIG. 4A, the front of the lens barrel 4 interferes with the lens cap 15. In this case, the first/second group movement amount (PI signal) is undetectable in the operation S5 of FIG. 5. Further, with the time-out determined in S8, the movement amount is determined to be within the cap detection area so that the cap re-detection operation is performed in S11.

In this cap-redetection operation, the number of times at which the cap is re-detected is counted (S21) and determined whether the number of times is within a predetermined number (which is 5 times in the first embodiment). Within the predetermined number of times, the cap detection and startup operation are performed (S23). That is, the first/second group motor 5A is driven to the standby position in the pantoscopic direction. Then, the operation waits for the first/second group reference position detector 10A to detect the reference position (where the signal switches from low to high) (S24).

During the driving of the first/second group motor 5A, the first/second group movement detector 8 counts the edges of the pulse signal (PI signal), to thereby detect the movement amount. With the PI signal detected (in S25), the movement amount is counted (S26).

In the driving voltage switching determination (in S27), the driving voltage is switched in accordance with the number of PI signals (movement amount) counted. During the startup period of the first/second group motor 5A immediately after the start-up thereof, the driving voltage is set to be lower than a stationary voltage in order to prevent an inrush current from the DC motor. After the startup period (8 pulses) counted, the driving voltage is raised from 2.0V to 2.8V which is a driving voltage for the cap detection area. Then, it is raised to the stationary voltage of 3.3V after completion of detection of the cap detection area (over 100 pulses). Setting the driving voltage for the cap detection area to be lower than the stationary voltage makes it possible to relieve the impact of the interference between the lens barrel 4 and the lens cap attached thereto (See FIG. 8).

With no PI signal (the first/second group movement amount) detected in the operation of S25, a length of time where no PI signal has been detected is determined (time-out determination) (S28). With no time-out determined (No in S28), the operation returns to the first/second group movement amount (PI signal) detection (S25).

Note that a length of the time-out for the cap detection area is set to be shorter than that for the other areas. This can shorten the energizing time for the first/second group motor 5A in driving lock-up state with the lens cap attached, and reduce the load on the drive gear system.

When the time-out is determined in S28 (Yes in S28), and the movement amount is determined to be over the cap detection area (S29), an error operation is performed (S30), in which the first/second group motor 5A is stopped from driving.

When the time-out is determined and then the movement amount is determined to be within the cap detection area, a brake is applied to the first/second group motor 5A (S31). With an interval of 500 ms from completion of the brake operation, the number of times at which the cap is re-detected is determined again (S21).

With the lens cap attached to the lens barrel 4, the time-out will occur when the movement amount (PI signals) after the startup of the first/second group motor 5A is to be within the cap detection area, so that the above cap re-detection operation will be repeated. In a case where the user removes the lens cap during the repeated operation, the time-out will not occur so that the movement amount is to be normally counted and the lens barrel 4 can reaches the reference position.

In S24, when the first/second group reference position detector 10A has detected the reference position (where the signal switches from low to high), the counted number of PI signals (movement amount) is reset to zero, and the operation waits for the 200$^{th}$ pulse as a pantoscopic stop position to be detected (the first/second group stop position detection in S32).

Without the first/second group stop's reaching the stop position in S32, the first/second group movement amount (PI signals) is detected (S33). When the PI signal has been detected, the movement amount is counted (S34), and the driving voltage is switched according to the counted number of the PI signals (S35). That is, with a remaining number of the movement amount (PI signal) being 50 to a target value thereof being 200 pulses, the driving voltage is decreased to 2.0V. With the remaining number being 10 pulses, it is further decreases to 1.5V. This makes it possible to reduce the overrun of the motor at the stop and improve the stop precision thereof (See FIG. 8).

When the PI signal (the first/second group movement amount) has not been detected in S33, a length of time (time-out) where the PI signal has not been detected is determined (No in S36). With no time-out determined (No in S36), the operation returns to the first/second group movement amount (PI signal) detection in S33. With the time-out determined (Yes in S36), the error operation is performed (S37), in which the first/second group motor 5A is stopped from driving.

Also, when the first/second group reaches the stop position in S32, a brake is applied to the first/second group motor 5A (S38). During the brake operation, the amount of the overrun is measured, thereby deciding a final first/second group position. This completes the startup operation of the first/second group (lens barrel) after the cap re-detection operation.

Figure 9:
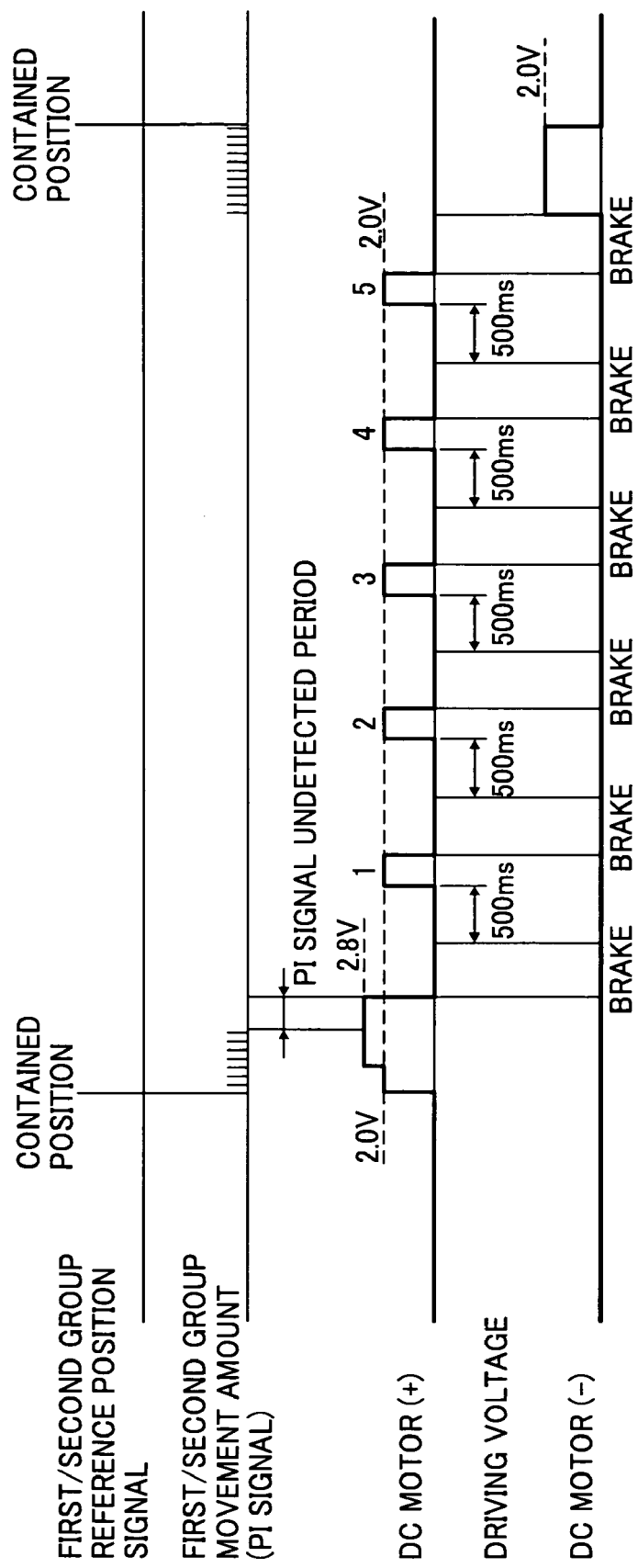
FIG. 9 is timing chart for drive control over the lens barrel to move in a direction of the contained position.

When the number of times at which the cap is re-detected is over a predetermined number (which is 5 times in the first embodiment), a cap detection completing operation (the first/second group moving back operation) is performed (S22). That is, the first/second group motor 5A is driven back in the direction of the contained position at the low voltage of 2.0V by the number of pulses equivalent to the cap detection area (See FIG. 9). Thus, driving the motor at the low voltage makes it possible to alleviate the impact of the interference between the edge of the lens barrel and the motor. Moreover, for repetitive lens cap detection operation, it is preferable that the first/second group motor 5A is driven with the lens cap interfering with the front of the lens barrel 4, since it is made possible to reduce the impact therebetween and the load on the drive gear system. For this reason, the moving back operation is performed last in the cap re-detection operation.

Note that in the moving back operation, a predetermined amount in which the first/second group (lens barrel) is moved in the direction of the contained position is set to the number of pulses equivalent to the cap detection area. However, it can be an actual movement amount from the contained position to a contact position between the lens cap and the lens barrel, or a sum of the actual movement amount and a predetermined marginal amount.

Figure 10:
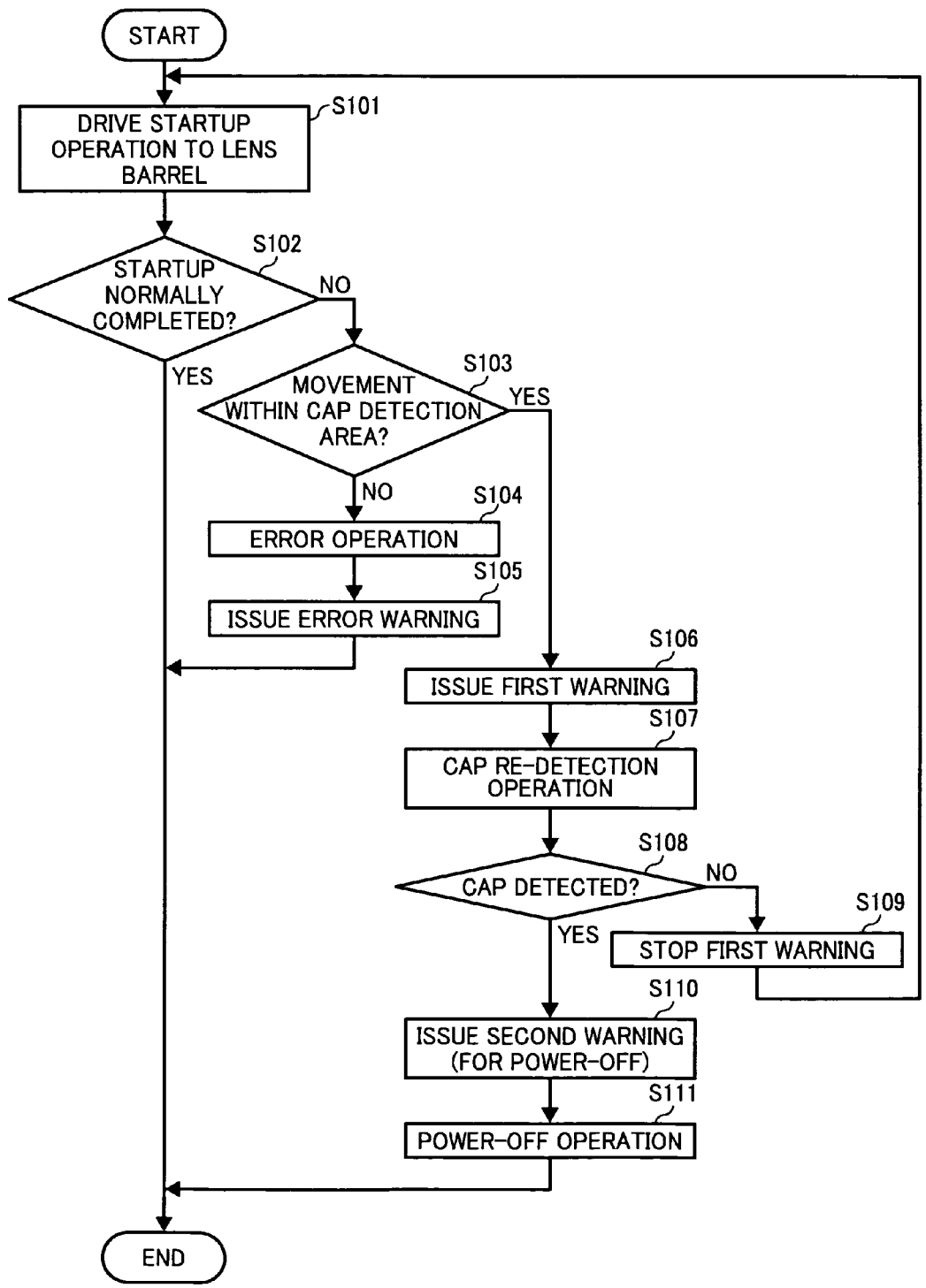
FIG. 10 is a flowchart for warning issuance operation according to the first embodiment.

Next, a warning issuance operation according to the first embodiment will be described with reference to the flowchart in FIG. 10. Here, the power-on of the apparatus starts the startup operation of the lens barrel. The driving startup operation of the lens barrel is the same to that with reference to FIGS. 5 and 6; therefore, a description thereon will be omitted.

At the completion of the startup operation (S101), it is determined whether or not the startup of the lens barrel has been normally completed (S102). With no time-out determined, the startup operation is determined to be normally completed, thereby ending the operation. On the contrary, with the time-out determined, the startup operation is determined to be non-normally completed, thereby detecting movement amount in the cap detection area (S103). In the cap detection area detection (S9 in FIG. 9), it is determined whether or not the movement amount at the time-out is within the cap detection area. With the movement amount over the cap detection area, the error operation is performed (S104), the error warning is issued via the notifying section (CPU 7) to the user (S105), completing the operation.

Also, when the movement amount is within the cap detection area in S103, a first warning is issued via the notifying section (S106), and the cap re-detection operation (See S11 in FIG. 5 and FIG. 7) is performed (S107). According to the first embodiment, the issuance of the first warning is made by displaying a message, "Please remove the lens cap" on display means such as LCD, CRT. However, the user can be notified by voice via a speaker or the like, or lighting or blinking of LED etc.

The cap re-detection operation in S107 is the same to that described with reference to FIGS. 7 and 8, therefore, a description thereon will be omitted.

After the cap re-detection operation in S107, the cap detection is performed. With the cap undetected, the first warning is stopped (S109), and the operation returns to the drive startup operation for the lens barrel in S101.

With the cap detected in S108, a second warning, "Power will be turned off" is issued via the notifying section to the user (S110). Moreover, power supply control means for the apparatus (CPU 7 in FIG. 1, control program or the like, for example) turns off the power supply (S111). Before the issuance of the second warning in S110, the first/second group (lens barrel) is moved to the contained position in the moving back operation in S22 of FIG. 7 (not shown).

Also, upon receiving an instruction for power-off from the user during the cap re-detection operation, the apparatus is powered off after the first/second group moving back operation in S22.

Second Embodiment

The cap re-detection operation according to the second embodiment will be described with reference to the flowchart in FIG. 11 and the timing chart in FIG. 12.

In the drive start-up operation with the lens barrel 4 in the state of FIG. 4A, the front of the lens barrel 4 interferes with the lens cap 15. In this case, the first/second group movement amount (PI signal) is undetectable. Further, when the time-out is determined, the movement amount is determined to be within the cap detection area so that the cap re-detection operation is performed.

In the cap-redetection operation according to the second embodiment, it is determined whether the number of times at which the cap is re-detected is within a predetermined number (which is 5 times in the first embodiment) (S41). Within the predetermined number of times, the cap detection and start-up operation are performed (S43). That is, the first/second group motor 5A is driven to the standby position in the pantoscopic direction by the number of pulses equivalent to the cap detection area (100 pulses).

Thereafter, the operation waits until the 100$^{th}$ pulse as the end of the cap detection area is detected in the first/second group stop position detection (S44), in other words, until the movement amount is to be the number of pulses equivalent to the cap detection area. During driving of the first/second group motor 5A, the first/second group movement amount (PI signal) is detected (S45). With the PI signal detected, the first/second group movement detector 8 determines the movement amount by counting the edges of the pulse signal (PI signal) (S46).

In driving voltage switching (S47), the driving voltage is switched in accordance with the number of PI signals (movement amount) counted. During the startup period of the first/second group motor 5A immediately after the start-up thereof, the driving voltage is set to be lower than a stationary voltage in order to prevent an inrush current from the DC motor. After the startup period (8 pulses), the driving voltage is raised from 2.0V to 2.8V which is a driving voltage for the cap detection area. Setting the driving voltage for the cap detection area to be lower than the stationary voltage makes it possible to relieve the impact of the interference between the lens barrel 4 and the lens cap attached thereto.

With no PI signal (the first/second group movement amount) detected in the operation of S45, the length of time where no PI signal has been detected is determined (time-out determination) (S48). With no time-out determination (No in S48), the operation returns to the first/second group movement amount (PI signal) detection in S45.

Note that the length of the time-out period for the cap detection area is set to be shorter than that for the other areas. This can shorten the energizing time for the first/second group motor 5A in driving lock-up state with the lens cap attached, and further reduce the load on the drive gear system.

When the time-out is determined in S28 (Yes in S48), a brake is applied to the first/second group motor 5A (S49). With an interval of 500 ms from completion of the brake operation, the number of cap re-detections (S41) is determined again.

With the lens cap attached to the lens barrel 4, the time-out will occur when the movement amount (PI signals) after the startup of the first/second group motor 5A is within the cap detection area, so that the above cap re-detection operation will be repeated. In a case where the user removes the lens cap during the repeated operation, the time-out will not occur so that the movement amount is to be normally counted and the lens barrel 4 can reaches the target stop position.

Also, when the first/second group reaches the stop position (the end position of the cap detection area) at the 100$^{th}$ pulse in S44, a brake is applied to the first/second group motor 5A (S50). This completes the cap re-detection operation to the first/second group 1A, determining that the lens cap is not attached. With an interval of 250 ms from the completion of the operation, normal startup operation is started (S51). The details of the startup operation are the same as those according to the first embodiment shown in FIG. 7 except for the cap re-detection operation in S24 to S38, S29 and S31, therefore, a description thereon will be omitted.

According to the second embodiment, the movement amount of the first/second group motor 5A is set to the number of pulses equivalent to the cap detection area (100 pulses), which can reduce the projection of the lens barrel 4. Accordingly, even in a case where the user removes the lens cap during the detection operation, the lens barrel is prevented from suddenly projecting to a pantoscopic position. It is thus preventable of such an undesirable incident that a surprised user due to the sudden projection thereof accidentally drops the camera.

Moreover, in the cap-redetection operation according to the second embodiment, it is determined whether the number of times at which the cap is re-detected is within a predetermined number (which is 5 times in the second embodiment) (S41). Within the predetermined number of times, the cap detection completion operation (the first/second group moving back operation) is performed (S42). That is, the first/second group motor 5A is driven in the direction of the contained position (See FIG. 12).

The first/second group motor 5A is driven back in the direction of the contained position at the low voltage of 2.0V by the number of pulses equivalent to the cap detection area. Thus, driving the motor at the low voltage makes it possible to alleviate the impact of the interference between the edge of lens barrel and the motor. Moreover, for repetitive lens cap detection operation, it is preferable that the first/second group motor 5A is driven with the lens cap interfering with the front of the lens barrel 4, since it is made possible to reduce the impact therebetween and the load on the drive gear system. For this reason, the moving back operation is performed last in the cap re-detection operation.

Third Embodiment

The warning issuance operation according to the third embodiment will be described with reference to the flowchart in FIG. 13. The same operations as those in the first embodiment will be given the same numeric codes shown in FIG. 10.

Upon the power-on of the apparatus, the drive startup operation of the lens barrel is performed. The details of the startup operation are the same as those according to the first embodiment shown in FIGS. 5 and 6, therefore, a description thereon will be omitted.

At the completion of the startup operation (S101), it is determined whether or not the startup of the lens barrel has been normally completed (S102). With no time-out determined, the startup operation is determined to be normally completed, thereby ending the operation. On the contrary, with the time-out determined, the startup operation is determined to be non-normally completed in S102, thereby performing movement amount detection (S103). In the movement amount detection, it is determined whether or not the movement amount at the time-out is within the cap detection area. With the movement amount over the cap detection area, the error operation is performed (S104), and the error warning is issued to the user via the notifying section (S105), completing the operation.

Also, when the movement amount is within the cap detection area in S103, the first warning as a message, "Please remove the lens cap" is issued via the notifying section (S106). Then, the cap re-detection operation is performed (S107). The cap re-detection operation in S107 is the same as that described with reference to FIGS. 7, 8, 10, and 11, therefore, a description thereon will be omitted.

After the cap re-detection operation in S107, the cap detection is performed (S108). With the cap undetected, the first warning is stopped (S109), and the operation returns to the drive startup operation for the lens barrel in S101.

With the cap detected in S108, a second warning, "Please remove the lens cap and press the power switch" is issued to the user via the notifying section (S112). According to the above first embodiment, the second warning prompts the user to turn off the power supply of the apparatus. In the third embodiment, however, before the turn-off the apparatus, it is checked whether or not the user is to perform a re-startup operation. According to a user's manipulation to the power switch, the result of the check-up is determined (S113).

In a predetermined period of time after the issuance of the second warning, it is checked whether the user manipulates the power switch (S115). The predetermined period is set to 10 seconds. Within the predetermined period, the operation returns to S113, and repeats the check-up for the manipulation to the power switch. Upon the power switch being pressed within 10 seconds, the second warning is terminated (S114). Then, the operation returns to S101, and the drive startup operation for the lens barrel is started again.

After the elapse of the predetermined period of 10 seconds in S115, a third warning, "Power will be turned off" is issued to the user via the notifying section (S116). The third warning is issued similarly to the first warning in the first embodiment. Also, the controller for the apparatus power supply performs the power-off operation (S117).

Note that the third embodiment describes an example where the re-startup operation is started upon the user's press onto the power switch. However, other switches can also be used as long as the user can manipulate them.

Fourth Embodiment

An operation after the cap re-detection operation according to the fourth embodiment will be described with reference to the flowchart in FIG. 14. The fourth embodiment concerns an operation after the issuance of the second warning in the warning issuance operation according to the third embodiment in FIG. 13.

Figure 13:
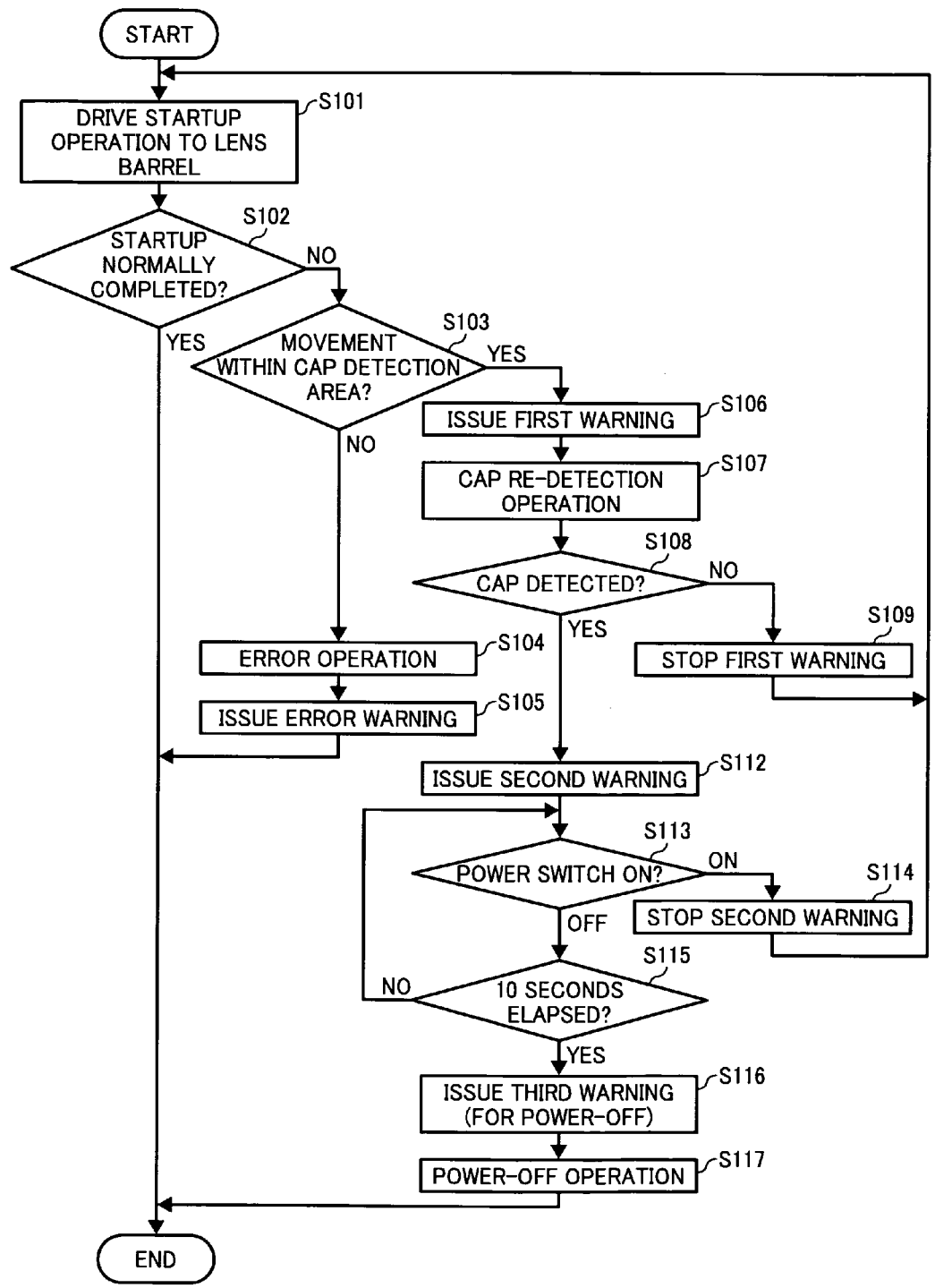
FIG. 13 is a flow chart for warning issuance operation according to the third embodiment.
Figure 14A:
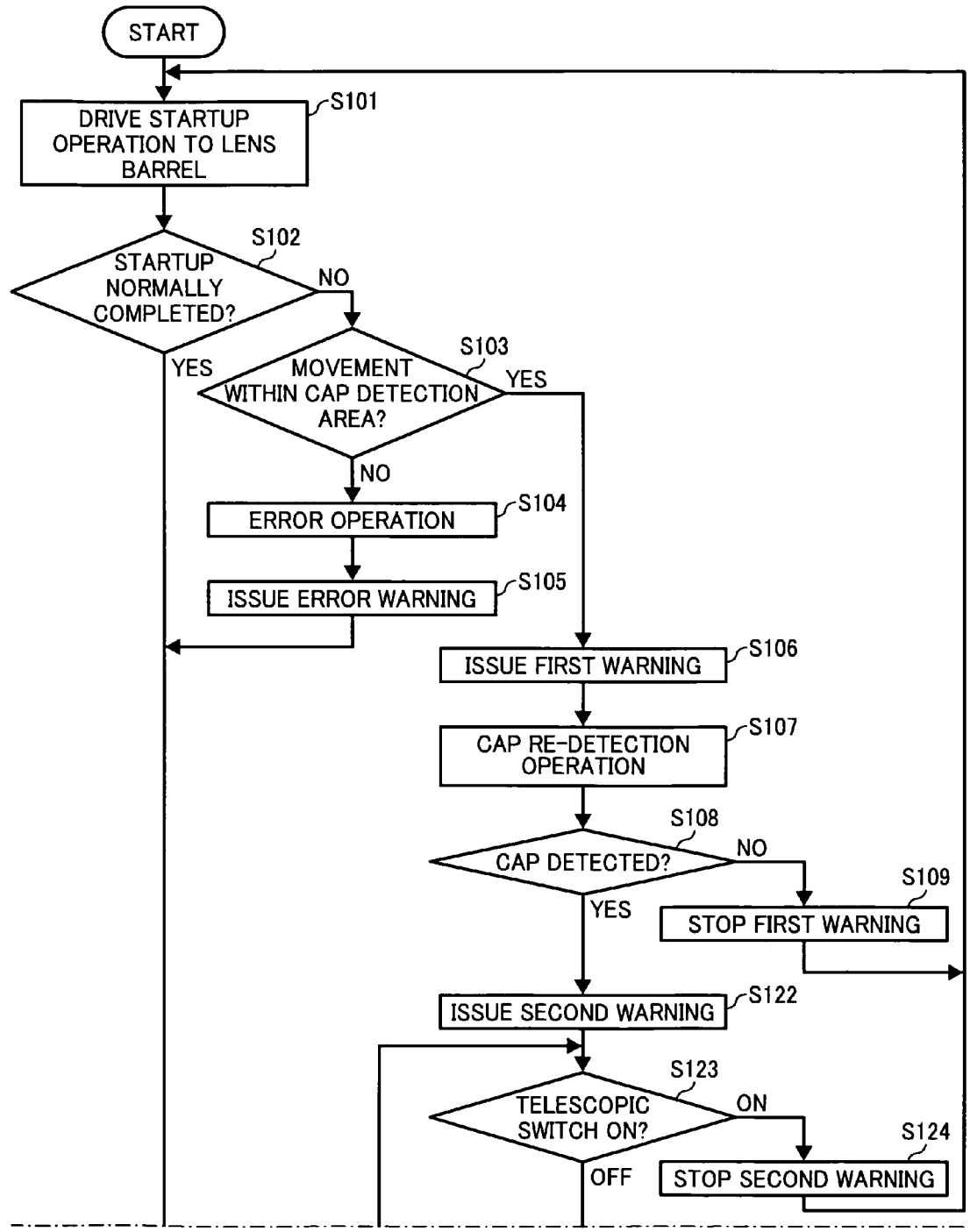

Similarly to the operation in FIG. 13, the drive startup operation for the lens barrel is started upon the power-on of the apparatus in FIG. 14. The driving startup operation therefor is the same as that with reference to FIGS. 5 and 6, and the cap detection operation in S101 to S108 is the same as that in FIG. 13 and given the same numeric codes, therefore, a description thereon will be omitted.

In S108 of FIG. 14, upon detecting the cap, the second warning is issued (S122). The second warning is that "Please remove the lens cap and press the telescopic switch". In the fourth embodiment, before the power-off operation, the user is asked whether or not to perform re-startup operation again (S123) or turn off the power supply (S125). According to the user's manipulation to the telescopic switch and the power switch, the operation is determined.

In a predetermined period of time after the issuance of the second warning, a check-up is made for the user's manipulation to the telescopic switch and the instruction for the power-off (S126). The predetermined period of time is set to 10 seconds. Within the predetermined period, the above check-up operation in S123 and S125 is repeated. Upon the press to the telescopic switch within 10 seconds, for example, the second warning is terminated (S124), and the operation returns to the drive startup operation for the lens barrel in S101.

Figure 7A:
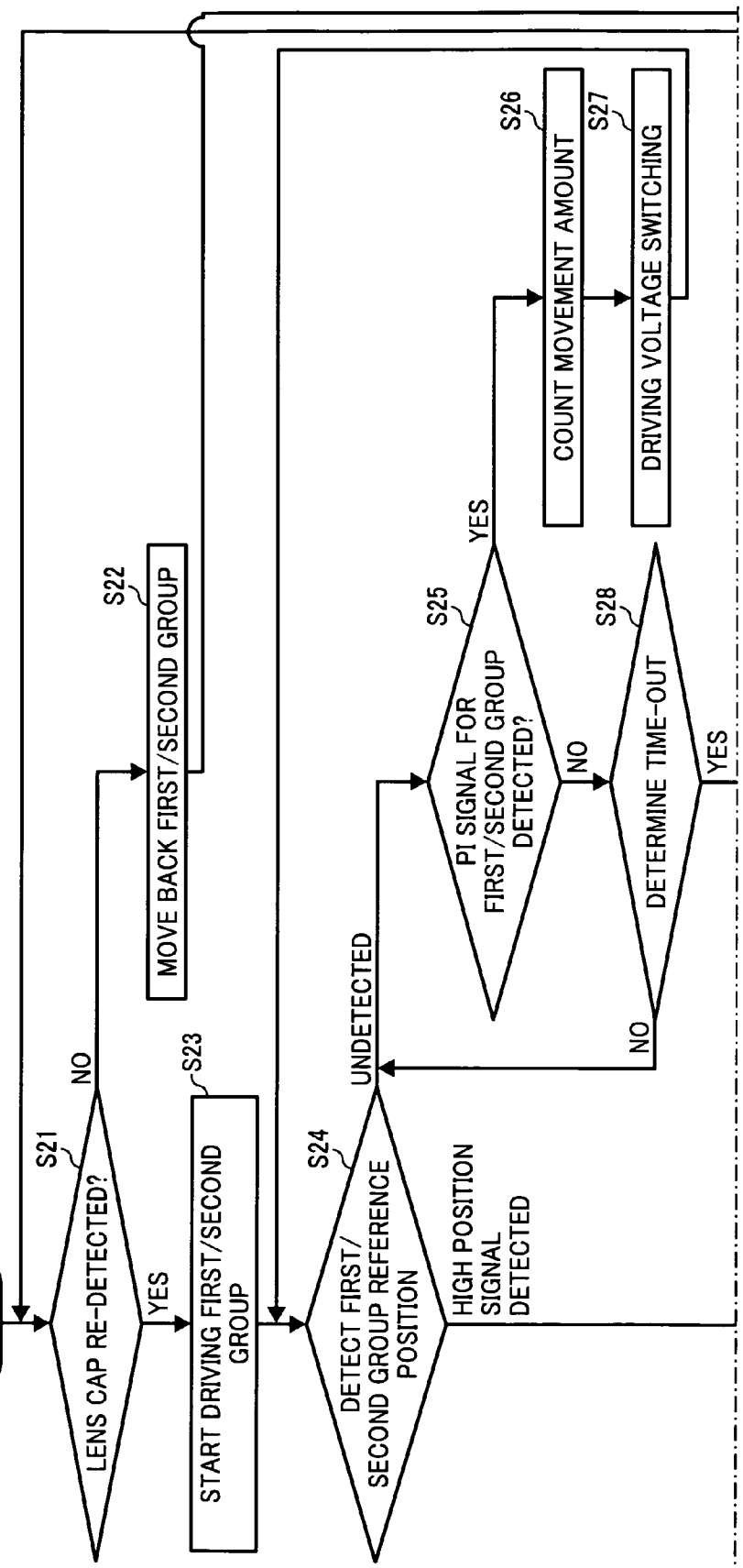
FIGS. 7A-7B are a flowchart for cap re-detection operation according to the first embodiment.
Figure 7B:
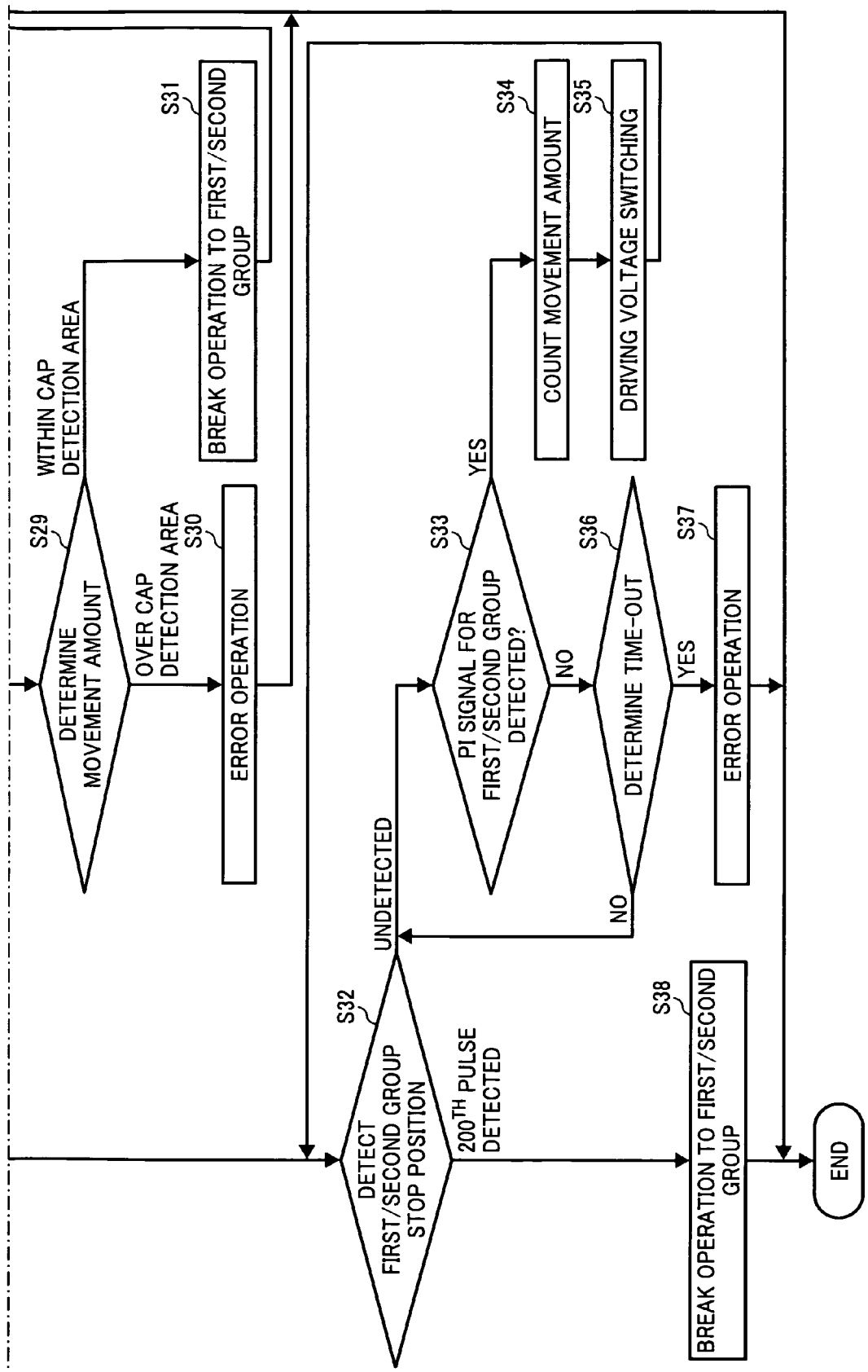
Figure 11A:
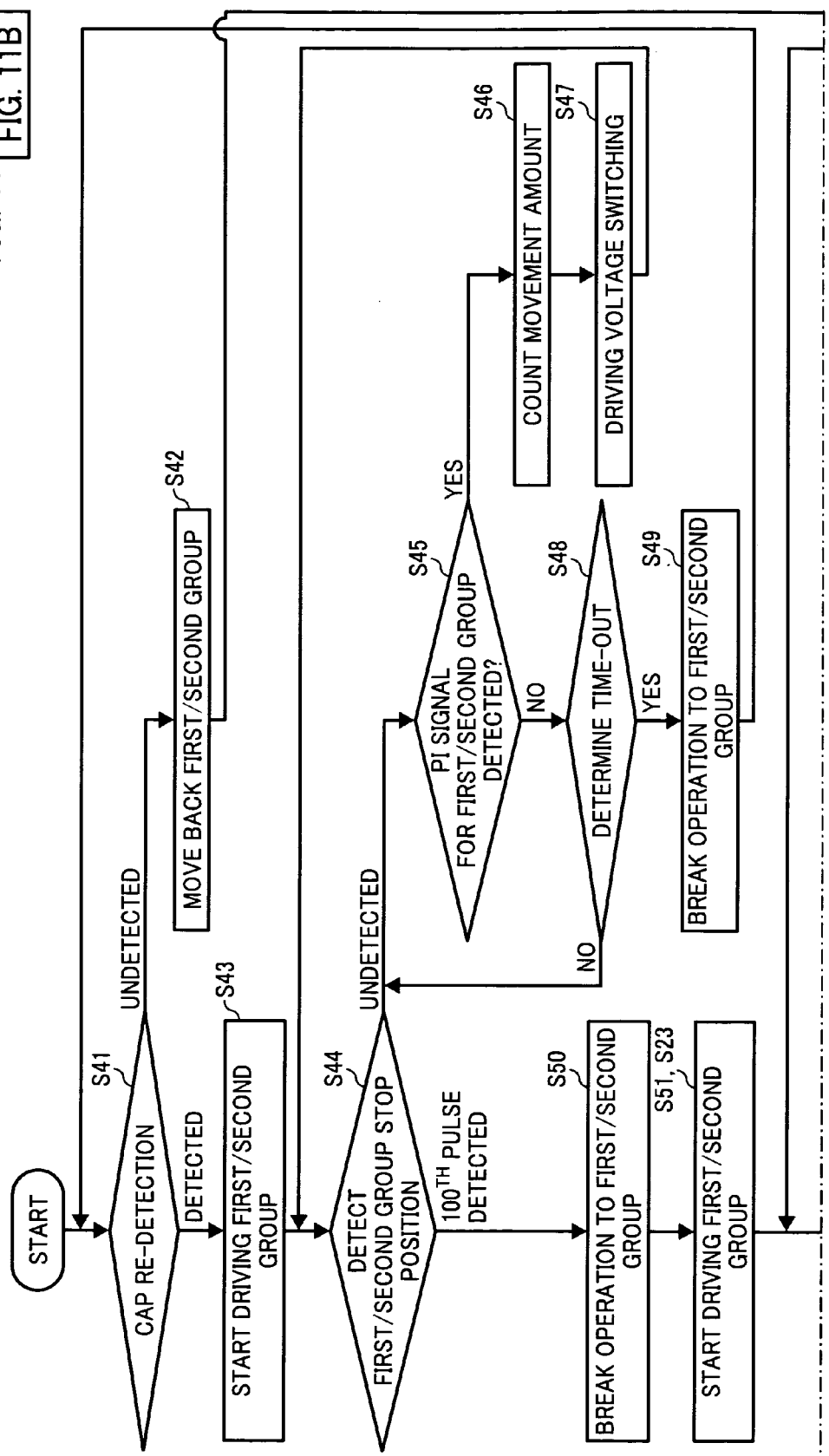
FIGS. 11A-11B are a flowchart for cap re-detection operation according to the second embodiment.
Figure 11B:
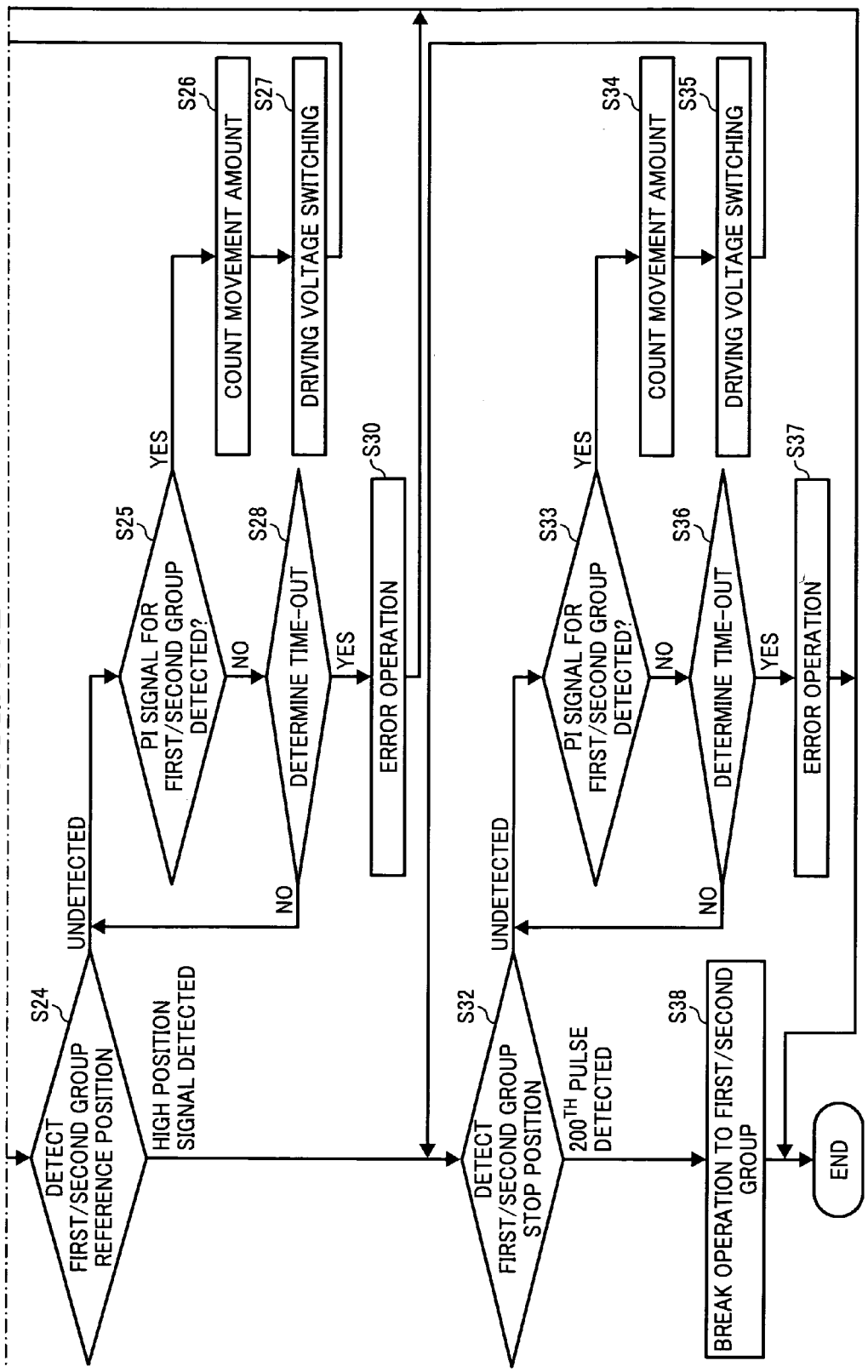
Figure 12:
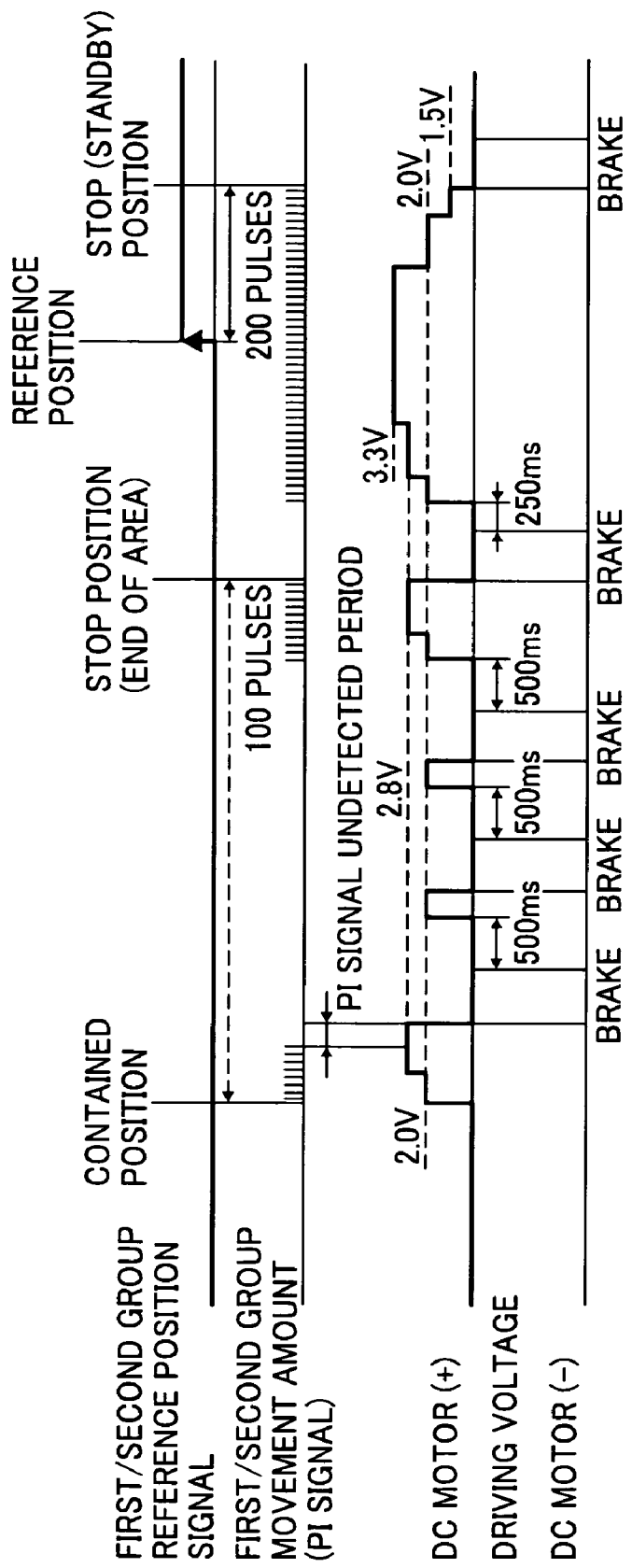
FIG. 12 is a timing chart for cap re-detection operation according to the second embodiment.

After the elapse of 10 seconds in S126, the first/second group motor moves back the first/second group to the contained position through the operation in S22, FIG. 7 and S42, FIG. 11 (S127). Upon receipt of the power-off instruction from the user in S125, the operation also proceeds to S127. Thereafter, the third warning "Power will be turned off" is issued to the user via the notifying section (S128). The controller for the apparatus power supply performs the power-off operation (S129).

According to the above operation, the first/second group (lens barrel) is in the contained position when the apparatus is powered off, so that it is made possible to re-attach the lens cap without any problem.

Note that the fourth embodiment describes an example where upon the user's press to the telescopic switch, the operation is started, similarly to the third embodiment. However, needless to say that the other switches can be used as long as the user can manipulate them.

Figure 15B:
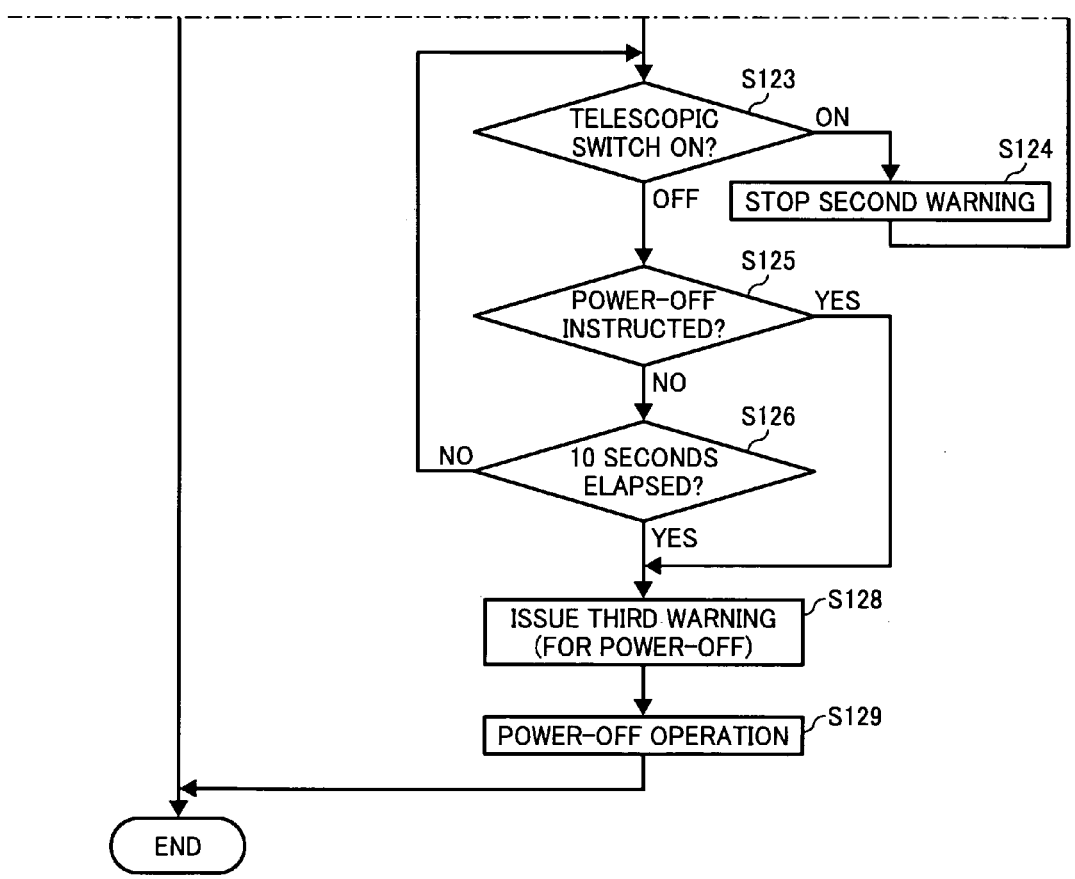

Another example according to the fourth embodiment will be described with reference to the flowchart for the operation after the cap re-detection in FIG. 15. A difference from the operation in FIG. 14 is in that the first/second group moving back operation in S131 comes after the cap detected in the cap detection in S108 instead of the first/second group moving back operation in S127 before the third warning issuance in S128. The rest of the operation is the same as that in FIG. 14, therefore, a description thereon will be omitted.

Through the above operation, with the detected lens cap remaining attached, the apparatus automatically moves back the first/second group (lens barrel) to the contained position, and waits in the predetermined period for the user's instruction to start the re-startup operation or power-off operation, or the automatic power-off operation. The lens barrel is configured to move back to the contained position after the predetermined number of times of cap re-detection operations, so that it is possible to re-attach the lens cap to the lens barrel without any problem.

As described in the first to fourth embodiment, the photographic lens drive control apparatus is configured to detect the attachment or detachment of the lens cap by moving the lens barrel and pressing it onto the lens cap without use of any other external mechanism, irrespective of the shape of the lens cap. Further, according to the present invention, the cap detection area is provided so that the attachment or detachment of the lens cap can be detected with high precision. Furthermore, suppressing the driving voltage in the cap detection area enables reduction of the impact due to the interference between the lens cap and the lens barrel. It is also made possible to notify the user of the attachment or detachment of the lens cap, and facilitate reattachment of the lens cap thereto.

Accordingly, the photographic lens drive control apparatus and the imaging apparatus according to the present invention are advantageous for detection of a detachable lens cap to cover the front of the photographic lens.

Although the present invention has been described in terms of exemplary embodiments, it is not limited thereto. It should be appreciated that variations may be made in the embodiments described by persons skilled in the art without departing from the scope of the present invention as defined by the following claims.

What is claimed is:

1. A photographic lens drive control apparatus comprising a collapsible lens barrel incorporating a photographic lens and moving from a non-photographable contained position to a photographable standby position, a lens barrel drive section driving the lens barrel, and a lens barrel movement detection section detecting an amount of movement of the lens barrel, the apparatus comprising:
a cap detection section which determines that a lens cap is attached to the lens barrel when the lens barrel movement detection section does not detect the movement amount of the lens barrel while the lens barrel drive section allows the lens barrel to move from the contained position to the standby position; and
a cap detection control section which performs a series of control over the lens barrel drive section to move the lens barrel from the contained position to the standby position and to stop the lens barrel from moving when the cap detection section determines that the lens cap is attached to the lens barrel, wherein
in a movement area of the lens barrel from the contained position to the standby position, an area where the lens barrel moves from the contained position within a predetermined movement amount is set to be a cap detection area.

2. A photographic lens drive control apparatus according to claim 1, wherein
a driving voltage at which the lens barrel drive section moves the lens barrel from the contained position to the standby position is set to be lower in the cap detection area than in the movement area other than the cap detection area.

3. A photographic lens drive control apparatus according to claim 1, wherein
when the lens barrel movement detection section does not detect the movement amount of the lens barrel in the cap detection area within a predetermined length of time, the cap detection section determines that the lens cap is attached to the lens barrel.

4. A photographic lens drive control apparatus according to claim 3, wherein
a first warning is issued to a user via a notifying section while the cap detection section determines that the lens cap is attached to the lens barrel.

5. A photographic lens drive control apparatus according to claim 1, wherein
while the cap detection section determines that the lens cap is attached to the lens barrel, the cap detection control section repetitively performs the series of control over the lens barrel drive section a predetermined number of times.

6. A photographic lens drive control apparatus according to claim 1, wherein
when the cap detection section determines that the lens cap is attached to the lens barrel after the cap detection control section repetitively performs the series of control over the lens barrel drive section the predetermined number of times, the cap detection control section moves the lens barrel by a predetermined amount in a direction of the contained position.

7. A photographic lens drive control apparatus according to claim 1, wherein
when the cap detection section determines that the lens cap is attached to the lens barrel after the cap detection control section repetitively performs the series of control over the lens barrel drive section a predetermined number of times, the cap detection control section moves the lens barrel by a predetermined amount in a direction of the contained position after elapse of a predetermined length of time.

8. A photographic lens drive control apparatus according to claim 6, wherein
a second warning is issued to a user via a notifying section when the cap detection control section is inhibited from performing the series of control over the lens barrel drive section after repetitively performing them the predetermined number of times.

9. A photographic lens drive control apparatus according to claim 8, wherein
a third warning is issued to a user via a notifying section when a predetermined length of time for issuing the second warning has elapsed.

10. A drive control method for a photographic lens drive control apparatus comprising a collapsible lens barrel incorporating a photographic lens and moving from a non-photographable contained position to a photographable standby position, a lens barrel drive section driving the lens barrel, and a lens barrel movement detection section detecting an amount of movement of the lens barrel, the method comprising:

a cap detection step of determining that a lens cap is attached to the lens barrel when the lens barrel movement detection section does not detect the movement amount of the lens barrel while the lens barrel drive section allows the lens barrel to move from the contained position to the standby position; and a cap detection control step of performing a series of control over the lens barrel drive section to move the lens barrel from the contained position to the standby position and to stop the lens barrel from moving when the cap detection section determines that the lens cap is attached to the lens barrel, wherein in a movement area of the lens barrel from the contained position to the standby position, an area where the lens barrel moves from the contained position within a predetermined movement amount is set to be a cap detection area.

11. A drive control method according to claim 10, wherein a driving voltage at which the lens barrel drive section moves the lens barrel from the contained position to the standby position is set to be lower in the cap detection area than in the movement area other than the cap detection area.

12. A drive control method according to claim 10, further comprising the step of determining that the lens cap is attached to the lens barrel when the lens barrel movement detection section does not detect the movement amount of the lens barrel in the cap detection area within a predetermined length of time.

13. A drive control method according to claim 12, further comprising the step of issuing a first warning to a user via a notifying section while the cap detection step determines that the lens cap is attached to the lens barrel.

14. A method according to claim 10, further comprising the step of repetitively performing the series of control over the lens barrel drive section a predetermined number of times by the cap detection step while the cap detection step determines that the lens cap is attached to the lens barrel.

15. A method according to claim 10, further comprising the step of moving the lens barrel by a predetermined amount in a direction of the contained position when the cap detection step determines that the lens cap is attached to the lens barrel after the cap detection control step repetitively performs the series of control over the lens barrel drive section the predetermined number of times.

16. A method according to claim 10, further comprising the step of moving the lens barrel by a predetermined amount in a direction of the contained position after elapse of a predetermined length of time when the cap detection step determines that the lens cap is attached to the lens barrel after the cap detection control step repetitively performs the series of control over the lens barrel drive section the predetermined number of times.

17. A method according to claim 15, further comprising the step of inhibiting the series of control over the lens barrel drive section after repetitively performing them in the cap detection control step, and issuing a second warning to a user via a notifying section.

18. A method according to claim 17, further comprising the step of issuing a third warning when a predetermined length of time for issuing the second warning has elapsed.

19. An imaging apparatus comprising a case having a detachable lens cap mounted to cover a front of a photographic lens and including an image capturing section, and a photographic lens drive control apparatus comprising a collapsible lens barrel incorporating a photographic lens and moving from a non-photographable contained position to a photographable standby position; a lens barrel drive section driving the lens barrel, and a lens barrel movement detection section detecting an amount of movement of the lens barrel; a cap detection section which determines that a lens cap is attached to the lens barrel when the lens barrel movement detection section does not detect the movement amount while the lens barrel drive section allows the lens barrel to move from the contained position to the standby position; and a cap detection control section which performs a series of control over the lens barrel drive section to move the lens barrel from the contained position to the standby position and to stop the lens barrel from moving when the cap detection section determines that the lens cap is attached to the lens barrel, wherein in a movement area of the lens barrel from the contained position to the standby position, an area where the lens barrel moves from the contained position within a predetermined movement amount is set to be a cap detection area.

* * * * *